United States Patent
Fitzgerald et al.

(10) Patent No.: US 12,343,765 B2
(45) Date of Patent: Jul. 1, 2025

(54) TIME-VARYING CONTROL OF A CONTROLLABLE AIR STREAM

(71) Applicant: AMP Robotics Corporation, Louisville, CO (US)

(72) Inventors: Jacob Fitzgerald, Wheat Ridge, CO (US); Jason M. Calaiaro, Denver, CO (US); Carter J. Schultz, Lafayette, CO (US); Cameron D. Douglas, Boston, MA (US); Matthew J. Koos, Lakewood, CO (US); Carson C. Potter, Denver, CO (US); Amanda M. Marrs, Seattle, WA (US); Matanya B. Horowitz, Golden, CO (US)

(73) Assignee: AMP Robotics Corporation, Louisville, CO (US)

( * ) Notice: Subject to any disclaimer, the term of this patent is extended or adjusted under 35 U.S.C. 154(b) by 0 days.

(21) Appl. No.: 18/598,751

(22) Filed: Mar. 7, 2024

(65) Prior Publication Data

US 2024/0299990 A1    Sep. 12, 2024

Related U.S. Application Data

(60) Provisional application No. 63/450,891, filed on Mar. 8, 2023.

(51) Int. Cl.
| | |
|---|---|
| *B07C 5/36* | (2006.01) |
| *B07C 5/342* | (2006.01) |
| *B65G 43/08* | (2006.01) |
| *B65G 47/52* | (2006.01) |

(52) U.S. Cl.
CPC .............. *B07C 5/368* (2013.01); *B07C 5/3422* (2013.01); *B65G 43/08* (2013.01); *B65G 47/525* (2013.01); *B07C 2501/0054* (2013.01); *B65G 2203/041* (2013.01)

(58) Field of Classification Search
CPC .................. B07C 5/368; B07C 5/3422; B07C 2501/0054; B65G 43/08; B65G 47/525; B65G 2203/041
See application file for complete search history.

(56) References Cited

U.S. PATENT DOCUMENTS

| | | | |
|---|---|---|---|
| 10,350,644 B1 * | 7/2019 | Doak | ...................... B07C 5/368 |
| 2007/0012604 A1 | 1/2007 | Basford | |
| 2007/0278139 A1 | 12/2007 | Cowling | |

(Continued)

*Primary Examiner* — Jacob S. Scott
*Assistant Examiner* — Miraj T. Patel
(74) *Attorney, Agent, or Firm* — Van Pelt, Yi & James LLP

(57) ABSTRACT

Time-varying control of a controllable air stream is disclosed, including: a set of image sensors configured to capture image data showing a target object being conveyed by a conveyor device along a Y-direction; an array of air jets located along an X-direction, wherein the X-direction crosses the Y-direction; and a processor configured to: receive the image data from the set of image sensors; determine a classification of the target object within the image data; and modify a two-dimensional firing polygon of air to be directed by the array of air jets on the target object based at least in part on the classification of the target object; and wherein the array of air jets is configured to perform a sorting operation on the target object as the target object is translated across the array of air jets based at least in part on the modified two-dimensional firing polygon.

23 Claims, 17 Drawing Sheets

(56) References Cited

U.S. PATENT DOCUMENTS

| | | |
|---|---|---|
| 2009/0250384 A1 | 10/2009 | Valerio |
| 2022/0106129 A1 | 4/2022 | Douglas |
| 2024/0342758 A1* | 10/2024 | Kumar .................... B07C 5/34 |

* cited by examiner

TIME-VARYING CONTROL OF A CONTROLLABLE AIR STREAM

CROSS REFERENCE TO OTHER APPLICATIONS

This application claims priority to U.S. Provisional Patent Application No. 63/450,891 entitled CONTROL SEQUENCE FOR AIR-BASED SORTING filed Mar. 8, 2023 which is incorporated herein by reference for all purposes.

BACKGROUND OF THE INVENTION

A heterogeneous stream of materials such as recyclables, for example, are received and sorted at a sorting facility to separate out a portion that can be further processed (e.g., recycled) and the remaining residue that cannot be repurposed. One example type of sorting action that can be performed on an object in the material stream is to direct airflow at the object while the object is in mid-air. Directing airflow at the object will alter the trajectory of the object and guide the object to a destination location (e.g., a collection container). However, different objects possess different characteristics and a static approach to direct airflow on objects may not successfully alter the trajectories of the objects to guide them towards the intended locations. Therefore, it would be desirable to utilize an airflow-based sorting technique that takes into account the specific characteristics of each object that is to be diverted using the airflow.

BRIEF DESCRIPTION OF THE DRAWINGS

Various embodiments of the invention are disclosed in the following detailed description and the accompanying drawings.

DETAILED DESCRIPTION

Figure 1:
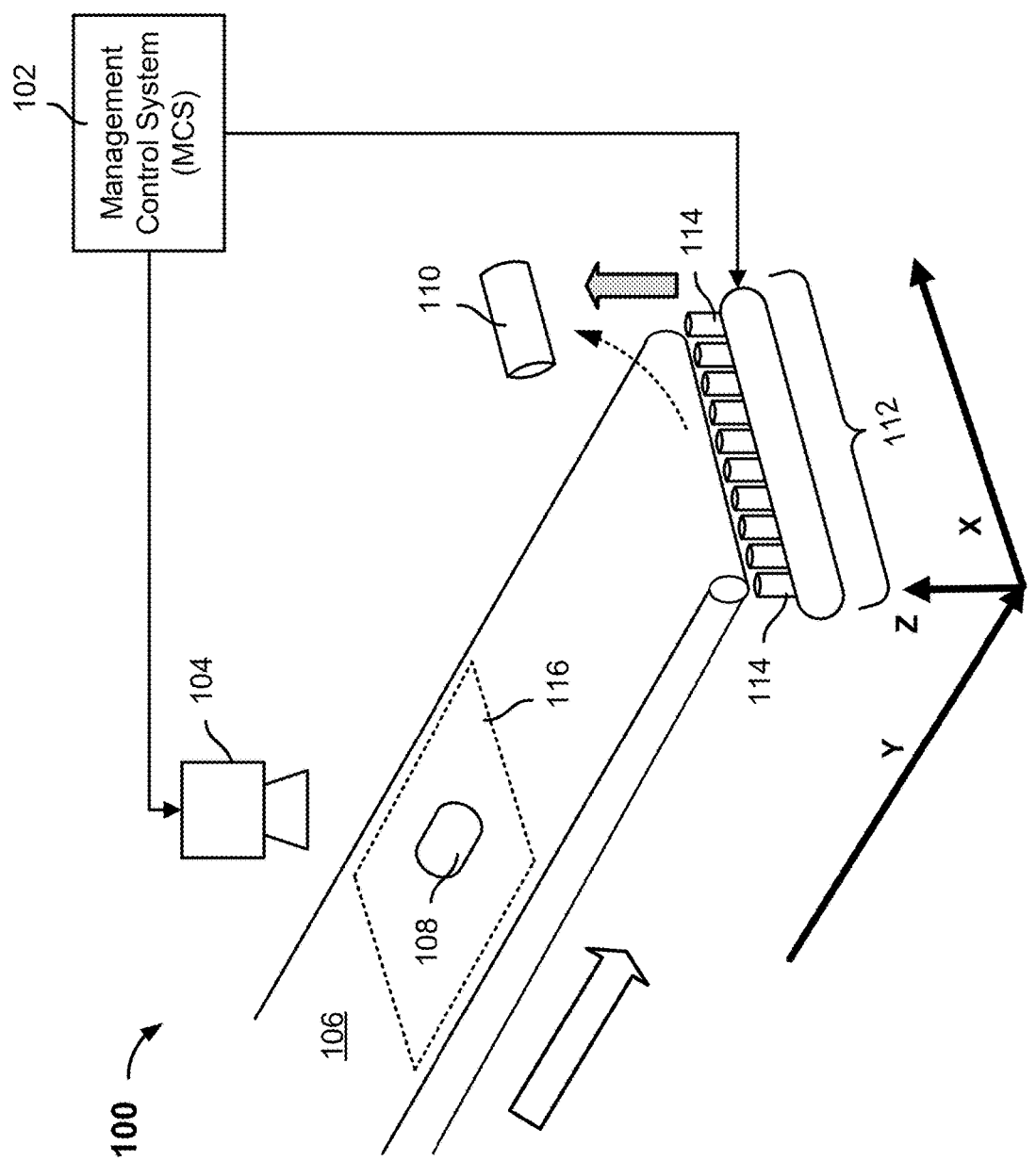
FIG. 1 is a diagram showing an embodiment of a sorting system that uses time-varying control of a controllable air stream.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of a time-varying control of an air-based sorting system are described herein. Image data is received from a set of image sensors. In various embodiments, one or more images of objects being conveyed on a conveyor device are received from one or more sensors (e.g., vision sensors) that are placed over the conveyor device. The image data shows a target object being conveyed by the conveyor device along a Y-direction and where an X-direction crosses the Y-direction. A classification of the target object within the image data is determined. In some embodiments, a "classification" of the target object comprises a set of attributes of the target object (e.g., a material type, a location, a shape, a size, dimensions, a mass, a density, a priority, a condition, a form factor, a color, a polymer, and/or a brand) and/or a characteristic of the target object in relation to a neighboring non-target object. A two-dimensional (2D) firing polygon of air that is to be directed by an array of air jets on the target object as the target object is translated across the array of air jets is determined. In some embodiments, an "array of air jets" comprises an array of air valves and in which each air valve can be activated to emit an airflow (e.g., of a specified pressure and/or for a specified length of time ("dwell time")) independently of other air valves in the same array. The array of air jets (which is also sometimes referred to as an "air jet array sorting device" or simply "air jet sorting device") is arranged along the X-direction. In various embodiments, a 2D "firing polygon" is associated with a stored airflow profile and describes a sequence of specified air jets in the array to activate to emit airflow (e.g., at either a fixed or variable pressure) at each point in time during the time period over which a corresponding object is expected to pass across the array of air jets. For example, the target object may pass across the array of air jets after it falls off an end of the conveyor device. The firing polygon is modified based on the classification of the target object. For example, the firing polygon can be modified by scaling up or down the number of air jets to activate at one or more points in time. The array of air jets is then caused to perform a sorting operation on the target object (e.g., to direct the target object towards a destination location within the sorting facility) by executing the modified firing polygon.

FIG. 1 is a diagram showing an embodiment of a sorting system that uses time-varying control of a controllable air stream. Sorting system 100 includes conveyor device 106 that is configured to convey a material stream, including objects 108 and 110, through a portion of a sorting facility. For example, the sorting facility may be configured to sort through a heterogeneous stream of waste materials to capture desirable objects (e.g., recyclable materials) that can be used for additional processing (e.g., made into new products). As the objects (e.g., objects 108 and 110) are conveyed in the Y-direction by conveyor device 106 and before the objects fall off the end of conveyor device 106, sensor 104 is configured to capture an image of the objects on conveyor device 106. As shown in FIG. 1, sensor 104 is configured to (e.g., periodically) capture images of objects within its field of view 116 across conveyor device 106. In some embodiments, sensor 104 is an optical/vision sensor (e.g., a camera). The image captured by sensor 104 is sent (e.g., over a network (not shown) or over a wired connection) to management control system (MCS) 102.

In some embodiments, MCS 102 can be implemented as a single physical node (e.g., computing device) using one or more processors that execute computer instructions and where the sorting facility devices communicate with the single node over a network. Alternatively, MCS 102 can be implemented as a network of two or more physical nodes (e.g., computing devices) comprising one or more processors to execute computer instructions and where the network of two or more physical nodes are distributed throughout the facility. In the event where there is a distributed network of physical nodes that form MCS 102, any number of networked vision sensors (e.g., such as sensor 104) and physical nodes of MCS 102 can be included in logical groupings that are sometimes referred to as "machine learning (ML) vision subsystems." For example, each ML vision subsystem comprises a processor configured to execute machine learning models for object identification, and include memory, networking capabilities, and a high-resolution camera.

As will be described in further detail below, MCS 102 is configured to apply machine learning to detect object(s) among images captured by sensor 104 and for a detected object, determine a classification of the object. In various embodiments, a "classification" of an object includes a set of attributes associated with the object (e.g., a material type, a location, a shape, a size, dimensions, a mass, a density, a priority, a condition, a form factor, a color, a polymer, and/or a brand) and if applicable, a characterization of the object in relation to a proximate neighboring object. MCS 102 is configured to compare each object's set of attributes to a configurable set of target object criteria (e.g., that describes objects that are targeted by a particular sorting device) and determine that an object that matches the target object criteria is a "target object" upon which a sorting device such as air jet array sorting device 112 is to be instructed to perform a sorting operation.

MCS 102 is configured to select an airflow profile that air jet array sorting device 112 is configured to execute in performing a sorting operation on a target object. In various embodiments, an "airflow profile" describes a firing polygon that is to be executed by air jet array sorting device 112. In various embodiments, an air jet array sorting device such as air jet array sorting device 112 comprises an array of (e.g., 83) air jets 114 (e.g., air valves) that can be controlled to emit a controllable stream of air at a target object to propel the target object towards a desired destination (e.g., a target conveyor device or a bunker) as the target object falls off the end of conveyor device 106. The air stream that can be emitted by air jet array sorting device 112 is dynamically adjustable in air pressure and width, for example, as a function of time. In the example of FIG. 1, air jet array sorting device 112 comprises a linear array of air jets arranged (e.g., along the X-direction) across the width of conveyor device 106 and is located at the end of the conveyor belt in the direction of the belt's movement. In some embodiments, the X-direction crosses the Y-direction without necessarily being perpendicular to the Y-direction. In some embodiments, the X-direction intersects the Y-direction at a right angle. MCS 102 is configured to select an airflow profile for a target object that matches the determined classification of the target object. The "firing polygon" that is included in each airflow profile defines at each of a series of points in time, which and how many air jets (e.g., a specified width) should fire (be activated to shoot positive airflow) and, optionally, at a specified air pressure. Put another way, the "firing polygon" corresponds to a 2D (across a plane in the X and Y directions) shape of air to be emitted by air jet array sorting device 112 over a period of time. An advantage of the 2D shape of air to be emitted by air jet array sorting device 112 over time is that it is a time-varying stream of air applied along a surface/dimension of a target object to ensure that appropriate force is directed at appropriate locations of the object to successfully guide the objects towards a desired direction. MCS 102 is configured to modify the firing polygon of the selected airflow profile using the classification of the target object. The firing polygon can be modified in various ways in light of the classification of the target object. In a first example, the firing polygon can be shifted (e.g., along the X-direction) to match the detected location (e.g., along the X-direction) of the target object. In a second example, the firing polygon can be scaled up (e.g., the number of air jets to activate at each time is increased) to accommodate a larger 2D area/projection of the target object on the conveyor belt or scaled down (e.g., the number of air jets to activate at each time is decreased) to accommodate a smaller 2D area/projection of the target object on the conveyor belt based on the detected dimensions, shape, and/or size of the target object. In a third example, the firing polygon can be partially suppressed (e.g., one or more air jets are no longer activated at one or more points in time, which effectively modifies the 2D shape of the air stream) due to the proximity of an undesirable neighbor object.

In addition to determining the modified firing polygon for a target object, MCS 102 is also configured to predict a "start time" at which the target object is to start passing across the array of air jets of air jet array sorting device 112. In some embodiments, the region over which the array of air jets can emit airflow is referred to as "the controllable air stream target region." In some embodiments, MCS 102 is configured to determine this "start time" using the known speed of conveyor device 106 along the Y-direction, the target object's current location along the Y-direction, and/or other calibrations.

MCS 102 is configured to send the selected airflow profile, the modifications to the firing polygon, and the predicted start time to air jet array sorting device 112 (e.g., over a network or a wired connection, neither shown). In response, air jet array sorting device 112 is configured to perform a sorting operation on the target object by starting execution of the modified firing polygon at the predicted start time, which will result in shooting the corresponding 2D shape of air across the time duration as specified by the modified firing polygon at the target object. While not shown in FIG. 1, in some embodiments, air jet array sorting device 112 is configured to include a local, embedded controller that translates the selected airflow profile and/or modified firing polygon control instructions from MCS 102 into instructions necessary to control the air jet array, associated LEDs, or other proprietary devices in the system (e.g., an actuator), as will be described in further detail below.

For example, referring to FIG. 1, object 110 appears within an image captured by sensor 104. MCS 102 receives the image and then determines a classification for object 110. MCS 102 further determines that object 110 matches target object criteria. MCS 102 then selects an airflow profile of object 110 and modifies the firing polygon included in the airflow profile based on the classification of object 110. MCS 102 is further configured to predict a start time at which object 110 is to start to cross over the controllable air stream target region of air jet array sorting device 112. MCS 102 sends the selected airflow profile, the modifications to the firing polygon, and the predicted start time to air jet array sorting device 112. Air jet array sorting device 112 then starts to activate the air jets of the array that are described to fire at the first point in time of the modified firing polygon at/near the predicted start time so as to result in the successful deflection of object 110 in the desired upwards (e.g., along the Z-direction) direction. The desired direction could lead to a target conveyor device or a collection container.

An object that is not recognized by MCS 102 to be a target object (e.g., a non-target object) would not be fired upon by air jet array sorting device 112 and instead, fall off the end of conveyor device 106 into a residue collection or another conveyor device that conveys the object towards other sorting opportunities, potentially. While not shown in FIG. 1, one or more instances of a conveyor device, an overhead sensor, and an air jet array sorting device 112 may be located along the Y-direction downstream of conveyor device 106 to continue to circulate and potentially sort objects that are not fired upon by air jet array sorting device 112. At each air jet array sorting device, a specific material type may be targeted, enabling multiple material streams to be sorted within a combination/heterogenous stream. Conveyance lines coupled to air jet array sorting devices may be arranged as a set of branches (e.g., each air jet array sorting device selectively sorts a subset of one or more materials), and the system can be treated as binary sorters, enabling a large number of materials to be sorted within a sorting facility.

While FIG. 1 shows one overhead sensor (sensor 104) above the conveyor device, in some embodiments, more than one overhead sensor (e.g., more than one camera) can be installed above the conveyor device. In such an arrangement, each overhead sensor has a field of view that covers a portion of the overall width (across the X-direction) of the belt of conveyor device 106 and the images of objects that the sensors capture can be used by MCS 102 to instruct a corresponding portion of the array of air jets of air jet array sorting device 112 to perform a corresponding sorting operation using a selected airflow profile. More sensors may be used to increase granularity. For example, two overhead vision sensors may be placed above conveyor device 106 to support air jet array sorting device 112, with each vision sensor scanning materials across about 50% of the conveyance belt width. MCS 102 would analyze the respective images that are received from the two sensors and identify a target object of a desired material type from one of the images. MCS 102 can further select an airflow profile to use to execute to perform a sorting operation on the target object and instruct a corresponding subset (e.g., 50%) of the air jets of sorting device 112 that map to the sensor that captured the image from which the target object was identified to execute the firing polygon associated with that airflow profile on that target object as it passes across that subset of air jets.

While air jet array sorting device 112 is shown in FIG. 1 to shoot air upwards to deflect objects, in other examples, an air jet array sorting device can be placed above conveyor device 106 and configured to shoot air downwards to deflect objects in that direction.

Figure 2:
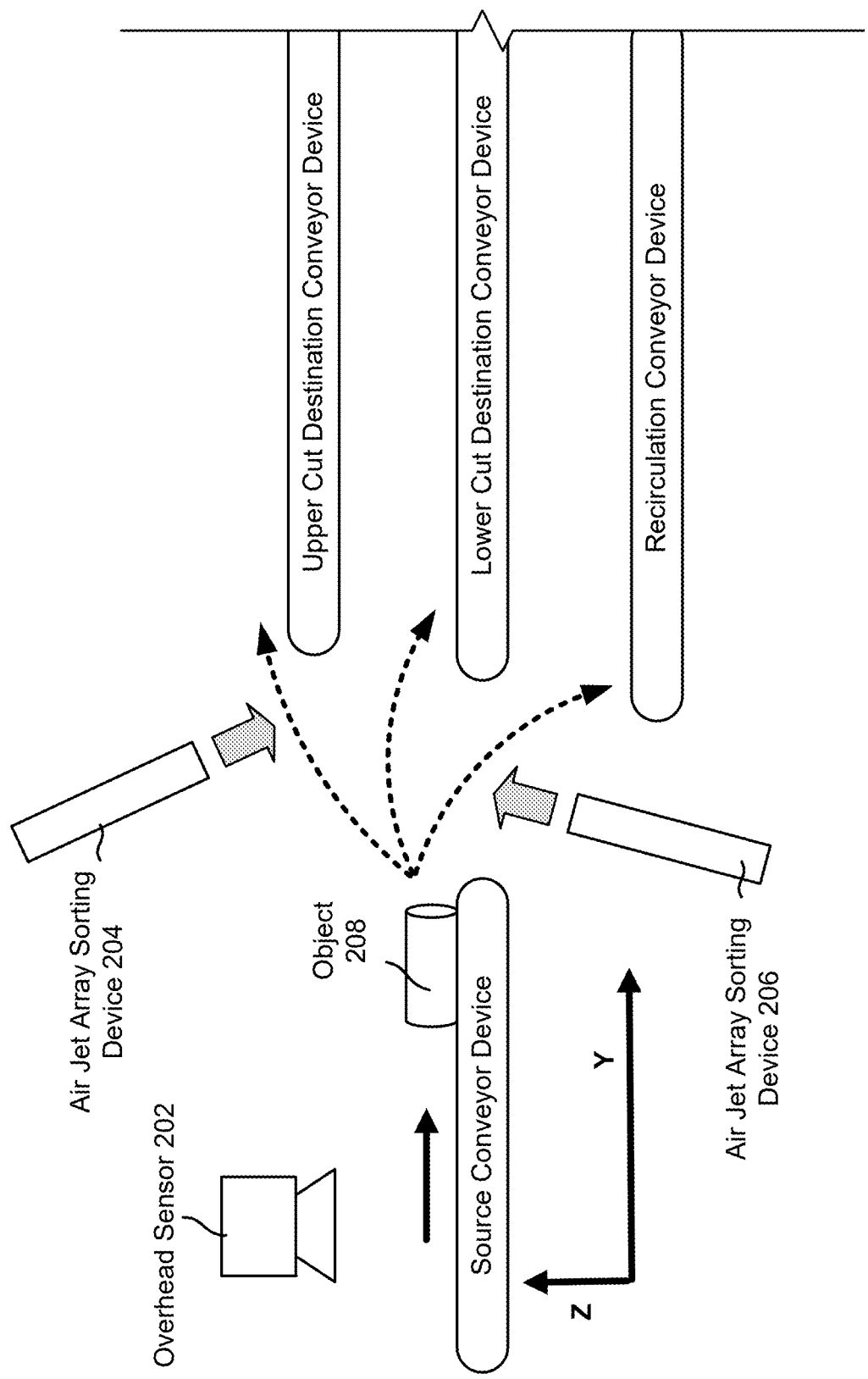
FIG. 2 is a diagram showing an example of a sorting system in which two air jet array sorting devices are arranged in a "dual cut" configuration in accordance with some embodiments.

When air jet array sorting device 112 shoots air in one direction in the junction between a conveyor device and a next conveyor device (or other sorting facility component) as is described in the example of FIG. 1, the sorting scheme is sometimes referred to as a "single cut." An example in which two different air jet array sorting devices respectively shoot air in two different directions at the junction between a conveyor device and a next conveyor device (or other sorting facility component) is the sorting scheme that is sometimes referred to as a "dual cut," which is shown in FIG. 2, described below.

FIG. 2 is a diagram showing an example of a sorting system in which two air jet array sorting devices are arranged in a "dual cut" configuration in accordance with some embodiments. In some embodiments, multiple air jet array sorting devices are co-located and used to sort different material types. The example of FIG. 2 shows a "dual-cut" configuration that features two air jet array sorting devices, Air Jet Array Sorting Device 204 and Air Jet Array Sorting Device 206, which may be configured to target objects of different types and propel them to respective destination conveyor devices. Each of Air Jet Array Sorting Devices 204 and 206 includes 83 jets each for a total of 166 air jets across the two devices. Each of Air Jet Array Sorting Devices 204 and 206 is configured to target objects of a different material type. In the example of FIG. 2, Air Jet Array Sorting Device

206 is configured to sort objects in a vertically higher direction than Air Jet Array Sorting Device 204. Put another way, Air Jet Array Sorting Device 206 is configured to fire downwards (e.g., in the Z-direction) at objects and Air Jet Array Sorting Device 204 is configured to fire upwards (e.g., in the Z-direction) at objects. As such, Air Jet Array Sorting Device 206 forms an "upper cut" and Air Jet Array Sorting Device 204 forms a "lower cut." An image that includes Object 208 is captured by Overhead Sensor 202 while Object 208 is being conveyed by Source Conveyor Device. The image is analyzed by the MCS (not shown) to determine a classification of Object 208. The MCS can determine which of Air Jet Array Sorting Devices 204 or 206, if any, should fire upon Object 208 based on which sorting device's target object criteria matches the classification of Object 208. If Object 208 matches the target object criteria of Air Jet Array Sorting Device 204, then the MCS would instruct Air Jet Array Sorting Device 204 to execute a modified firing polygon on Object 208 at a start time that Object 208 is predicted to pass below the controllable air stream target region of Air Jet Array Sorting Device 204. If Air Jet Array Sorting Device 206 is instructed to shoot air at Object 208 after Object 208 falls off from Source Conveyor Device, then Object 208 would be propelled upwards to Upper Cut Destination Conveyor Device. If Air Jet Array Sorting Device 204 is instructed to shoot air downwards at Object 208 after Object 208 falls off from Source Conveyor Device, then Object 208 would be propelled downwards to Lower Cut Destination Conveyor Device. Otherwise, if neither Air Jet Array Sorting Device 204 nor Air Jet Array Sorting Device 206 are instructed to shoot air on Object 208, then Object 208 would land on Recirculation Conveyor Device, from which it may eventually be sorted by downstream sorting device(s).

Figure 3:
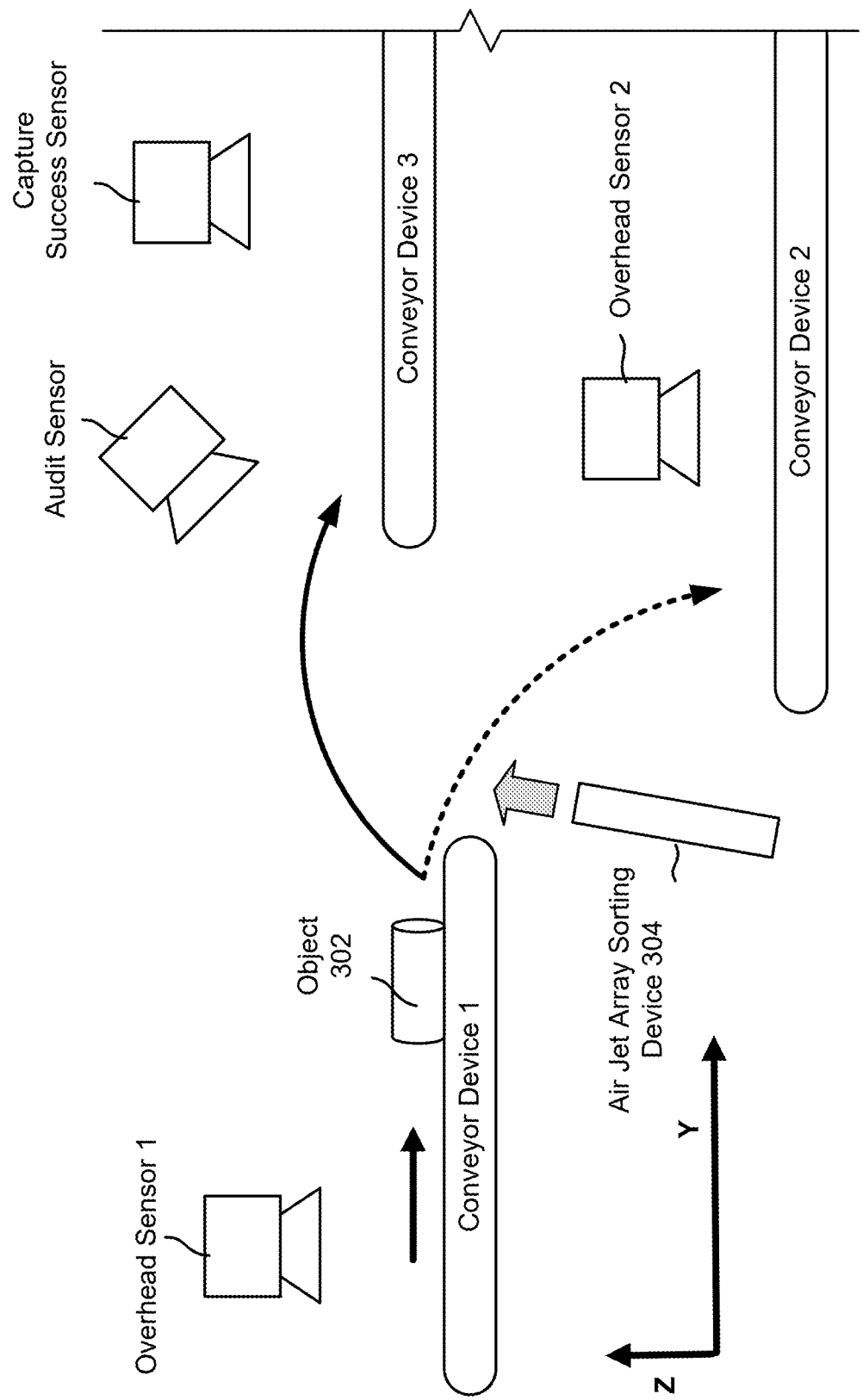
FIG. 3 is a diagram showing an example of a configuration of a sorting device and vision sensors that can be used to audit whether an object on which a sorting operation was performed (e.g., that was fired upon) by the sorting device was successfully sorted/captured.

FIG. 3 is a diagram showing an example of a configuration of a sorting device and vision sensors that can be used to audit whether an object on which a sorting operation was performed (e.g., that was fired upon) by the sorting device was successfully sorted/captured. Specifically, FIG. 3 shows the side view of an air jet array sorting device, the side view of various conveyor devices, and the side view of various vision sensors that can be used to detect whether a target object that was fired upon by a sorting device was successfully captured, meaning that it will be deposited into a bunker. The auditing of whether a sorting operation that was performed by an air jet array sorting device by executing a modified firing polygon as described herein was successful or not can be used as feedback to trigger one or more processes. A first example of such a process is the process of updating airflow profiles. For example, the firing polygon associated with an airflow profile can be updated over time if it is determined that the capture/sorting success rate of objects that are fired upon based on that firing polygon is lower than a given threshold. A second example of such a process is the process of maintaining (e.g., moving clogs from) air jets. For example, an air jet array sorting device for which historically executed sorting operations are associated with less than a threshold capture/sorting success rate can be cleaned to remove any potential clogging of one or more air jets that may be contributing to the lower than desired rate of successful sorting operations.

FIG. 3 shows a single cut air jet array sorting device (Air Jet Array Sorting Device 304) that is arranged (in the X-direction which extends into the page) across the width of Conveyor Device 1 (e.g., at the end of the belt from which objects fall off), with its air jets aimed to selectively fire on a target type of material in the direction of a collection bunker or another conveyor belt that will transport the material towards a bunker. In FIG. 3, an air jet array sorting device's firing actions propel target objects that fall off a first conveyor belt in a vertically higher direction, ending up on a higher conveyor belt that is configured to transport sorted objects towards a corresponding bunker, while non-sorted (non-target) objects land on a second conveyor belt on a lower level than the first conveyor belt to be potentially sorted downstream. Specifically, in FIG. 3, Overhead Sensor 1 captures an overhead image of objects such as Object 302 on Conveyor Device 1. The MCS (not shown) will apply machine learning model(s) to the overhead image to determine whether the attributes (e.g., material type, object type) of Object 302 match the current target object criteria of Air Jet Array Sorting Device 304. In the event that the attributes of Object 302 match the current target object criteria of Air Jet Sorting Device 304, the MCS will instruct Air Jet Array Sorting Device 304 to fire on Object 302 as it falls off Conveyor Device 1 to cause Object 302 to be propelled upwards to Conveyor Device 3, which is configured to convey material towards a bunker. In the event that the attributes of Object 302 do not match the current target object criteria of Air Jet Array Sorting Device 304, the MCS will not instruct Air Jet Array Sorting Device 304 to fire on Object 302 and it will fall off Conveyor Device 1 and then land on Conveyor Device 2.

In some embodiments, whether a target object that was determined to be fired upon by a sorting device is successfully sorted (and captured) into a bunker can be audited using one or more vision sensors at the sorting facility. For example, if the local MCS instructs Air Jet Array Sorting Device 304 to fire on Object 302, then whether Object 302 was successfully sorted and captured into the bunker can be determined based on image(s) that are captured by one or more of Audit Sensor, Overhead Sensor 2, and/or Capture Success Sensor. Audit Sensor can capture an image of Object 302 at the time that Air Jet Array Sorting Device 304 is instructed to fire on Object 302 and such an image can be manually evaluated or programmatically evaluated using machine learning to determine whether the image depicts a successful sorting operation (e.g., Object 302 appears within the image to be directed towards the desired destination of Conveyor Device 3). Overhead Sensor 2 can capture an image at a time subsequent to when Air Jet Array Sorting Device 304 is instructed to fire on Object 302 and such an image can be manually evaluated or programmatically evaluated using machine learning to determine whether the image shows Object 302 on Conveyor Device 2, which would mean that Object 2 had not been successfully sorted/captured. Capture Success Sensor can capture an image at a time subsequent to when Air Jet Array Sorting Device 304 is instructed to fire on Object 302 and such an image can be manually or programmatically evaluated using machine learning to determine whether the image shows Object 302 on Conveyor Device 3, which would mean that Object 2 had been successfully sorted/captured. The MCS can then use the (e.g., aggregated) object capture success or failure information to perform additional actions such as updating the airflow profiles to be used by Air Jet Array Sorting Device 304 to improve its future capture/sorting success rate and/or instruct another sorting device downstream of Air Jet Array Sorting Device 304 to fire on Object 302 in a subsequent attempt to capture it.

In some embodiments, in addition to providing feedback on sorting operation success or failures, the setup in FIG. 3 may also be used to provide easy and programmatic calibration of one or more air jet array sorting devices. Air jet calibration of some embodiments provides a mechanism for calibrating the system, including calibration of all aspects from initial object detection to ultimate sorting action by the air jet. In some embodiments, Audit Sensor of FIG. 3 can also be thought of as a Calibration Sensor and Air Jet Array Sorting Device 304 may include a light-emitting diode (LED) light corresponding to each air jet. Under normal operating conditions, desirable materials are identified by the MCS using image(s) from Overhead Sensor 1, and targeted by Air Jet Array Sorting Device 304 (after the materials fall off Conveyor Device 1) to be sorted onto the upper conveyance belt, Conveyor Device 3. Commands issued to individual air jets within the array allow granular targeting of objects. Undesirable materials are not targeted and thus drop to the lower residue belt, Conveyor Device 2, when they fall off the end of Conveyor Device 1. Alternatively, the objects that drop to the lower belt may not be residue and may be materials for which additional sorting is performed downstream. After identification of desirable objects, the system requires precise trajectory (e.g., position and velocity) measurements or estimates, and precise timing and alignment of air jet firing (and suppression) in order to successfully capture target objects and reject residue. If an air jet fires at the wrong time (e.g., before or after an object passes over it) or in the wrong place (e.g., the object does not pass over the air jet), then the object will not be successfully captured. Calibration errors may be introduced into the system from a variety of sources, including, but not limited to: vision sensor radial lens distortion, focal length error, height, yaw, nod, or tilt; X/Y jet position alignment; belt speed; and latencies (time lags) within the system. While each of these can be addressed separately, in many cases it is infeasible to address all sufficiently to attain the necessary precision for object capture. Therefore, various embodiments provide a solution to calibrate the system as a whole, without requiring each error to be addressed individually.

In some embodiments, calibration is performed through stochastic analysis of the input-output relationships of each diverting mechanism. Here, vision sensors and the MCS are utilized to analyze the performance of sorting devices over time, with the results fed back to the MCS as part of the quality control system. The MCS in turn may analyze the results (automatically or with operator input), and dynamically adjust parameters associated with the sorting devices to tune and ultimately optimize performance. This feedback loop may be utilized in conjunction with an optimal control system algorithm and dynamic modeling of the system (e.g., using a dynamic Kalman filter or other model) in order to ensure convergence of the calibration process on an ongoing basis.

Figure 4:
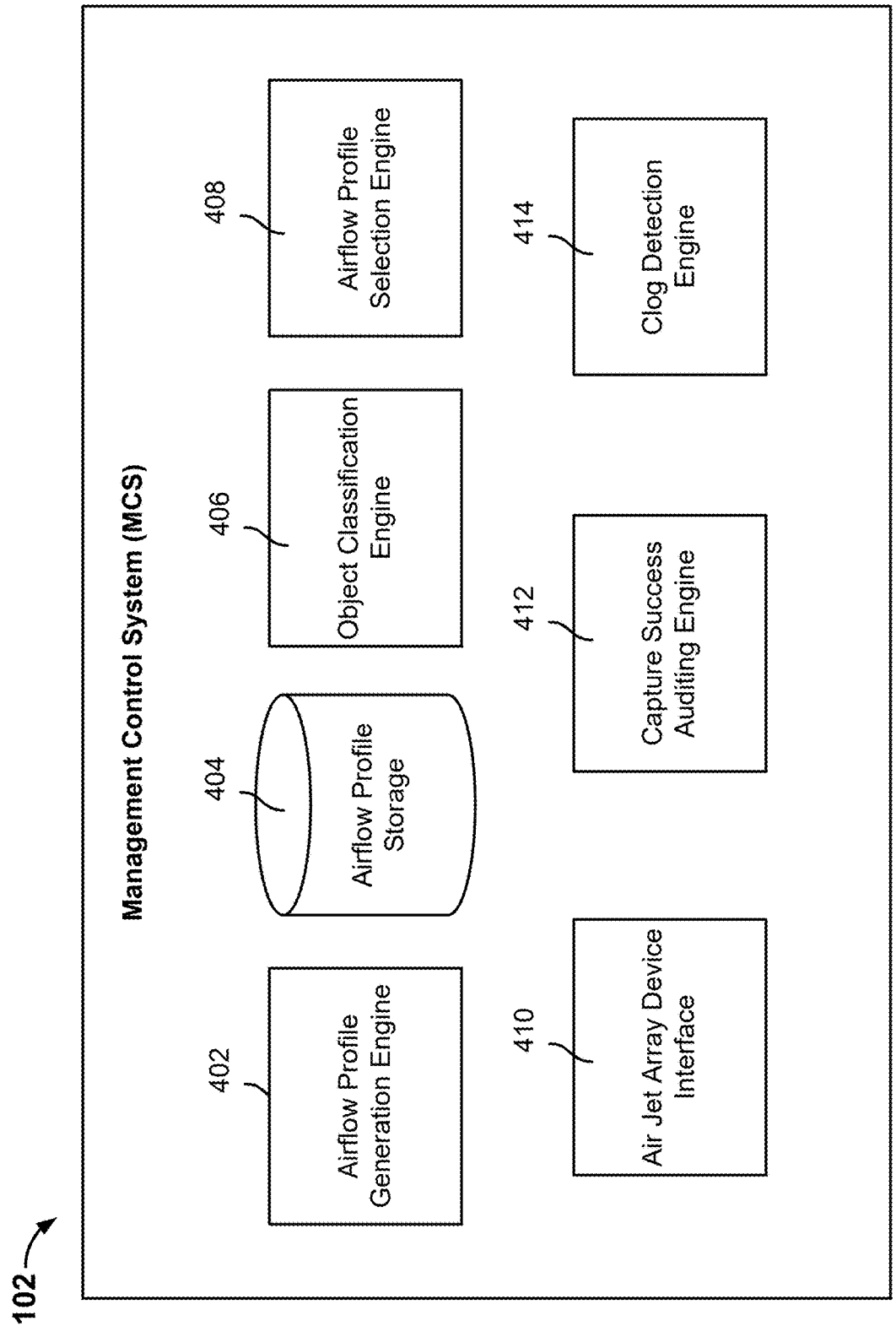
FIG. 4 is a diagram showing an example of a management control system (MCS) in accordance with some embodiments.

FIG. 4 is a diagram showing an example of a management control system (MCS) in accordance with some embodiments. In FIG. 2, the example MCS includes airflow profile generation engine 402, airflow profile storage 404, object classification engine 406, airflow profile selection engine 408, air jet array device interface 410, capture success auditing engine 412, and clog detection engine 414. In some embodiments, each of airflow profile generation engine 402, airflow profile storage 404, object classification engine 406, airflow profile selection engine 408, air jet array device interface 410, capture success auditing engine 412, and clog detection engine 414 may be implemented using hardware and/or software. In some embodiments, MCS 102 of FIG. 1 may be implemented, at least in part, using the example MCS described in FIG. 4.

Airflow profile generation engine 402 is configured to generate airflow profiles (e.g., during a training stage) to be used in the execution of the sorting operation by air jet array sorting devices (e.g., during runtime). In some embodiments, airflow profile generation engine 402 is configured to obtain candidate airflow profiles associated with a combination of object attributes and each candidate airflow profile includes a definition of a firing polygon that is manually generated or programmatically generated. For example, the firing polygon defined in an airflow profile comprises for each point in time across a series of points in time one or more of the following: the number of air jets to activate, the location of those air jets to activate in the array, the specified pressure of the air to emit by each of the air jets to activate, and the specified length of time to emit air by each of the air jets to activate. The series of points in time spans the duration/period of time that a target object of the associated combination of attributes is expected to pass across the air jets (the air jets could be located above or below the target object). In a specific example, at a point in time when a wider portion of the target object is predicted to cross the air jets, a greater number/width of air jets will be fired on the target object to apply sufficient force on that portion of the target object. Similarly, at a point in time when a narrower portion of the target object is predicted to cross the air jets, a fewer number of air jets will be fired on the target object to efficiently direct force on that portion of the target object.

In a first example, the candidate airflow profiles associated with a particular combination of object attributes are selected for and executed by air jet array sorting devices during runtime and capture success auditing engine 412 is configured to monitor the success or failure of sorting operations (e.g., using the feedback data that is described in FIG. 3, above) that were executed using each candidate airflow profile. In this first example, after an observation period, airflow profile generation engine 402 is configured to select the candidate airflow profile with the highest sorting success rate to be associated with and stored with the particular combination of object attributes at airflow profile storage 404. In a second example, a candidate airflow profile associated with a particular combination of object attributes is selected for and executed by air jet array sorting devices during runtime and capture success auditing engine 412 is configured to monitor the success or failure of sorting operations (e.g., using the feedback data that is described in FIG. 3, above) that were executed using that candidate airflow profile. In this second example, during an observation period, airflow profile generation engine 402 is configured to iteratively adjust the firing polygon based on an objective function and/or the sorting success rate of the previous version of the firing polygon until a stop criterion is met. Once this stop criterion is met, airflow profile generation engine 402 is configured to associate and store the candidate airflow profile with the latest version of the firing polygon with the particular combination of object attributes at airflow profile storage 404.

Airflow profile storage 404 stores various airflow profiles (e.g., generated by airflow profile generation engine 402). In some embodiments, each airflow profile that is stored at airflow profile storage 404 describes a corresponding firing polygon and also a combination of one or more object attributes for which the airflow profile should be selected (e.g., based on historical successes of the executing of the corresponding firing polygon on objects with that combination of object attributes). In a first example, airflow profile storage 404 may store a first airflow profile that defines a first firing polygon to be used to sort a target object that is an aluminum beverage can that has been deformed. In a second example, airflow profile storage 404 may store a second airflow profile that defines a second firing polygon to be used to sort a target object that is a plastic milk jug that contains liquid. In a third example, airflow profile storage 404 may store a third airflow profile that defines a third firing polygon to be used to sort a target object that is a bottle lying sideways on the conveyor belt. In some embodiments, airflow profile storage 404 also stores default airflow profiles that can be applied to various types of target objects.

Object classification engine 406 is configured to receive images of objects from (e.g., vision) sensors and then apply machine learning to the images to detect the objects and the classifications of the objects. In some embodiments, object classification engine 406 executes one or more of the following types of software: a neural network algorithm, reinforcement learning algorithm, support vector machine, regression (logistic or otherwise), Bayesian inference, and other statistical techniques. In particular, object classification engine 406 is configured to run one or more machine learning models that are configured to identify object(s) within the image received from a vision sensor (e.g., that are placed above a conveyor device). For example, the machine learning model(s) running at object classification engine 406 are configured to determine the location of (e.g., the outline of) objects and other attributes of the objects in the received image. Object classification engine 406 is configured to compare the determined object attributes (e.g., a material type, a shape, a size, dimensions, a mass, a density, a priority, a condition, a form factor, a color, a polymer, and/or a brand) to a reconfigurable set of target object criteria to determine those object(s) that match the criteria as "target objects" and those object(s) that do not match the criteria as "non-target objects." "Target objects" are objects which object classification engine 406 is to instruct a sorting device, which is located downstream from the vision sensor, to perform sorting operations on and to deposit the sorted/captured objects directly into a corresponding bunker or onto a conveyor device that conveys captured objects to the corresponding bunker.

In some embodiments, a target object's classification that is determined by object classification engine 406 includes its attributes, as described above, as well as a proximity degree between the target object and a nearby/neighbor non-target object. For example, a "neighbor non-target object" can be determined as a detected non-target object whose distance to the target object on the conveyor device is less than a predetermined distance. Examples of such a proximity degree between the target object and a nearby/neighbor non-target object are a distance between the target object and the neighbor non-target object or an amount of overlap between the target object and the neighbor non-target object. In some instances, using air to physically deflect a target object into a bunker or onto a target conveyor device may inadvertently also deflect a nearby, non-target (undesirable) object into the bunker or onto a destination conveyor device intended for the target object. The result of inadvertently deflecting a non-target object into the bunker is to decrease the purity rate of objects collected in one or more bunker(s), which is undesirable. For example, the "purity rate" corresponding to objects deposited into one or more bunkers can be defined as either 1) the total number of collected target objects over the total number of all objects collected at the bunker(s) or 2) the total weight of collected target objects over the total weight of all objects collected at the bunker(s). Typically, the greater the purity rate of objects collected at the bunker(s), the greater the (e.g., economic) value that is associated with the collected objects. As such, it is undesirable to allow neighboring non-target objects to be inadvertently deposited into a bunker when an air jet array sorting device fires on a target object because doing so will lower the purity rate associated with the objects collected at the bunker. Object classification engine 406 is configured to send the classification of a target object (e.g., including the proximity degree between the target object and a nearby/neighbor non-target object along with the attributes of the target object) to airflow profile selection engine 408.

Airflow profile selection engine 408 is configured to select an airflow profile corresponding to a target object based on the target object's classification (e.g., that was received from object classification engine 406). In some embodiments, airflow profile selection engine 408 is configured to select an airflow profile corresponding to a target object from airflow profile storage 404 by selecting a stored airflow profile whose associated combination of object attributes most closely matches on the target object's attributes.

After selecting the airflow profile corresponding to the target object, airflow profile selection engine 408 is configured to modify the firing polygon of the selected airflow profile based on the target object's attributes and/or the proximity degree between the target object and a neighbor non-target object. In a first example, airflow profile selection engine 408 can modify the firing polygon of the selected airflow profile by shifting which air jets (e.g., along the X-direction) to fire at each point in time to correspond to the target object's location (e.g., along the X-direction). In a second example, airflow profile selection engine 408 can modify the firing polygon of the selected airflow profile by suppressing firing of one or more air jets at one or more points in time to result in a modified 2D shape of airflow that excludes the overlap between the target object and the non-target object (so as to avoid firing on the non-target object and inadvertently sorting it).

In some embodiments, airflow profile selection engine 408 is further configured to predict a start time at which the target object is to pass across the controllable air stream target region of the air jet array sorting device that is configured to execute the modified firing polygon of the selected airflow profile on the target object. For example, airflow profile selection engine 408 can estimate this start time based on the detected location of the target object, the known speed of the conveyor device, and a known/calibrated distance between the end of the conveyor device and the controllable air stream target region of the air jet array sorting device. In some embodiments, airflow profile selection engine 408 is further configured to also predict an end time at which the target object is to finish passing across the controllable air stream target region of the air jet array sorting device. For example, airflow profile selection engine 408 can estimate this end time based on the speed of the conveyor device and/or the detected dimensions/shape/size of the target object.

Air jet array device interface 410 is configured to send the selected airflow profile, the modified firing polygon, and the estimated start and/or end times corresponding to a target object (e.g., that were determined by airflow profile selection engine 408) to the air jet array sorting device that is configured to perform the sorting operation on the target object. In some embodiments, air jet array device interface 410 is configured to send the airflow profile, the modified firing polygon, and the estimated start and/or end times with data structures including compatible commands that can be used by an embedded controller at the sorting device to effectuate the air jet firings as described in the modified firing polygon. In some other embodiments, air jet array device interface 410 is configured to send the airflow profile, the modified firing polygon, and the estimated start and/or end times to the air jet array sorting device and then the embedded controller at the sorting device locally generates compatible commands to effectuate the air jet firings as described in the modified firing polygon to reduce the latency associated with receiving such commands over a network.

As mentioned above, capture success auditing engine 412 is configured to monitor whether each sorting operation that is performed by an air jet array sorting device on a target object based on instructions sent by air jet array sorting device interface 410 is successful or not. Over time, capture success auditing engine 412 can determine a capture/sorting success rate to each airflow profile that was instructed to be used by air jet array device interface 410 and use that as a form of feedback data for, for example, updating the airflow profile and/or determining whether maintenance of the air jet array sorting device is needed. For example, capture success auditing engine 412 may identify missed or poorly targeted objects and use such feedback data (e.g., images) to dynamically modify one or more airflow profiles for use in the facility. The modified information may also be fed back to the neural training software to update the neural model or aerodynamic profile with a modified mechanism for capture of a specific object type.

Clog detection engine 414 is configured to detect and trigger remediation actions of clogs at one or more air jets in an air jet array sorting device. In some embodiments, microphones are coupled to the sensing system in a sorting facility and located near air jet arrays. Audio from failure cases (e.g., jet clog or blockage) are recorded and stored for later comparison by clog detection engine 414 in order to determine when and where a blockage occurs. In some embodiments, audio recordings are fed to a machine learning system and used to identify failure events in the operational system. Such audio training may be coupled with other visual and non-visual data to train the system in the recognition of clog or failure events. In some embodiments, valve solenoid current and/or valve pressure is monitored by clog detection engine 414 (on a per air jet basis or across multiple jets). This data may then be used by clog detection engine 414 to determine failures of individual or groups of jets. Such data may be further used to train a machine learning system to identify failure events in the valve/jet system. The data may also be coupled to other sensor data (e.g., machine learning vision cameras monitoring the air jet array) to enable the system to recognize such failure events. In response to detection of a clog at one or more air jets in an array or just periodically, clog detection engine 414 is configured to utilize positive pressure (laminar flow) in one or more jets to prevent material from accumulating on the air jets. Clog detection engine 414 can activate auxiliary blowers/air jets that are positioned to point at the air jets to periodically blast the jet nozzles with high pressure air or liquids to remove any accumulated debris. This approach enables the removal of buildup around nozzle edges that could lead to an occluded nozzle. Clog detection engine 414 or the embedded air jet controller may implement a maintenance routine that implements regular cleaning actions (e.g., extremely high jet air pressure or actuation of cleaning jets/blowers to prevent jet clogs). Alternatively, or in conjunction, a machine learning vision system may be utilized to identify potential clogging and trigger similar actions through clog detection engine 414.

Figure 5:
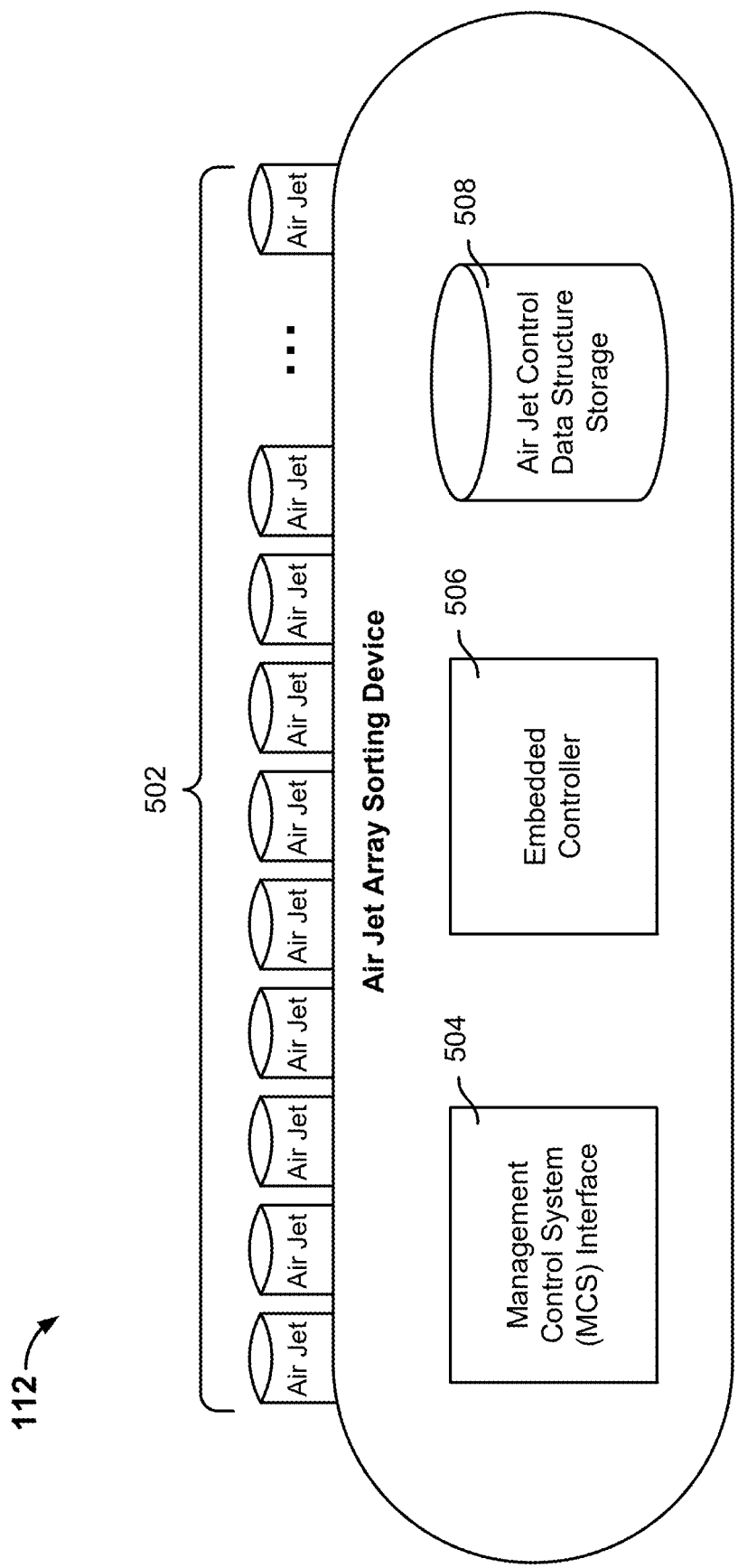
FIG. 5 is a diagram showing an example of an air jet array sorting device in accordance with some embodiments.

FIG. 5 is a diagram showing an example of an air jet array sorting device in accordance with some embodiments. In some embodiments, air jet array sorting device 112 of FIG. 1 may be implemented, at least in part, using the example air jet array sorting device described in FIG. 5. As shown in FIG. 5, the example air jet array sorting device includes air jet array 502, management control system (MCS) interface 504, embedded controller 506, and air jet control data structure storage 508. Each of management control system (MCS) interface 504, embedded controller 506, and air jet control data structure storage 508 may be implemented using hardware and/or software.

Each air jet of air jet array 502 is an air valve/nozzle ("air jet") that is coupled to a pressurized air source (not shown). For example, air jet array 502 may include 83 air jets. Each air jet of air jet array 502 may be independently controlled by embedded controller 506, as will be described below, to emit positive airflow (e.g., at either a fixed pressure or a variable pressure) at a certain point in time. Put another way, at a given point in time, a given subset of contiguous or non-contiguous air jets in air jet array 502 can be activated via jet commands from embedded controller 506 to fire positive airflow and where the air pressure and firing duration that is emitted by each fired air jet can be controlled by embedded controller 506.

MCS 504 is configured to receive control signals/instructions from an MCS (e.g., such as MCS 102 of FIG. 1 or the example MCS described in FIG. 4). In some embodiments, the control signals/instructions that are received from the MCS include control signals/instructions related to performing a sorting operation on a target object that is to translate across the controllable air stream target region of the air jet array sorting device. In some embodiments, such control signals/instructions include the selected airflow profile, the modified firing polygon, and the estimated start and/or end times corresponding to a target object. In some embodiments, such control signals/instructions also include (e.g., a time-series of) air jet commands that are specific/compatible with the recipient's particular air jet array sorting device.

Embedded controller 506 is configured to activate the air jets of air jet array 502 to perform a sorting operation on a target object based on control signals/instructions received from the MCS that are received at MCS interface 504. In some embodiments, embedded controller 506 may be implemented by one or more controllers. Embedded controller 506 may run an embedded operating system (e.g., embedded Linux, or other real-time operating system), or may not require a traditional operating system. In response to receiving control signals from the MCS via a network (e.g., WiFi, Ethernet), embedded controller 506 is configured to generate the instructions necessary to control air jet array 502, associated LEDs, if any, or other proprietary devices in the system (e.g., an actuator). In some embodiments, the controller software implements one or more wireline or wireless protocols that are compatible with the controlled devices (e.g., the air jet array or an LED light bar). In some embodiments, the control signals received from the MCS may already include a data structure that includes a time series of air jet commands for embedded controller 506 to execute to perform the modified firing polygon of an instructed sorting operation. When the MCS originated control signals include jet commands, latency may be introduced in sending more data from the MCS over a network to the air jet array sorting device but embedded controller 506 may require fewer computing resources by not needing to locally generate such jet commands. In some other embodiments, the control signals received from the MCS do not already include a data structure that includes a time series of air jet commands for embedded controller 506 to execute and instead, embedded controller 506 processes the received input control signals (e.g. instructions from the MCS) and then references internal data structure(s) stored at air jet control data structure storage 508 that are specific to the control of air jets of air jet array 502, and uses the control signals and located internal data structure(s) to generate commands compatible with the target device to effectuate the desired actions. For example, the MCS may generate a signal to the embedded controller specifying activation of pressure profiles for 4 of 83 jets within air jet array 502 across a time series. The pressure profiles may be stored internally at air jet control data structure storage 508, and embedded controller 506 generates a time varying control sequence of commands to the applicable air jets in air jet array 502 resulting in a time-based varying pressure being created at the target air jets. When internal data structures including jet commands that are configured to execute airflow profiles are already locally stored at the air jet array sorting device in air jet control data structure storage 508, the MCS only needs to specify a selected airflow profile, the modified firing polygon, and a predicted (e.g., actuation) start time in its control signals to embedded controller 506. In some embodiments, the MCS generates control signals ahead of time (e.g., before a target object is within range of the controllable air stream target region of the air jet array sorting device), and sends the control signals to embedded controller 506 along with a start time based upon the estimated object trajectory. In this way, latencies introduced by sending a larger control signal payload between the MCS and embedded controller 506 are eliminated from consideration, allowing the control signals to focus on the exact parameters needed for air jet actuation. This pre-planning also allows the air jet array sorting device to utilize the latency saved by "pre-planned" firing to further optimize its firing pattern against physical actuation limitations caused by the pulsewidth of the actuation signal or physical characteristics of the valve. Regardless of where the jet commands corresponding to a modified firing polygon are generated, embedded controller 506 is configured to use the jet commands to cause the specified subset of air jets to start activating (e.g., to start emit positive airflow at a specified pressure and/or for a specified duration) at each point in time that is prescribed by the modified firing polygon over the duration prescribed by the modified firing polygon to effectuate a 2D airstream.

Figure 6:
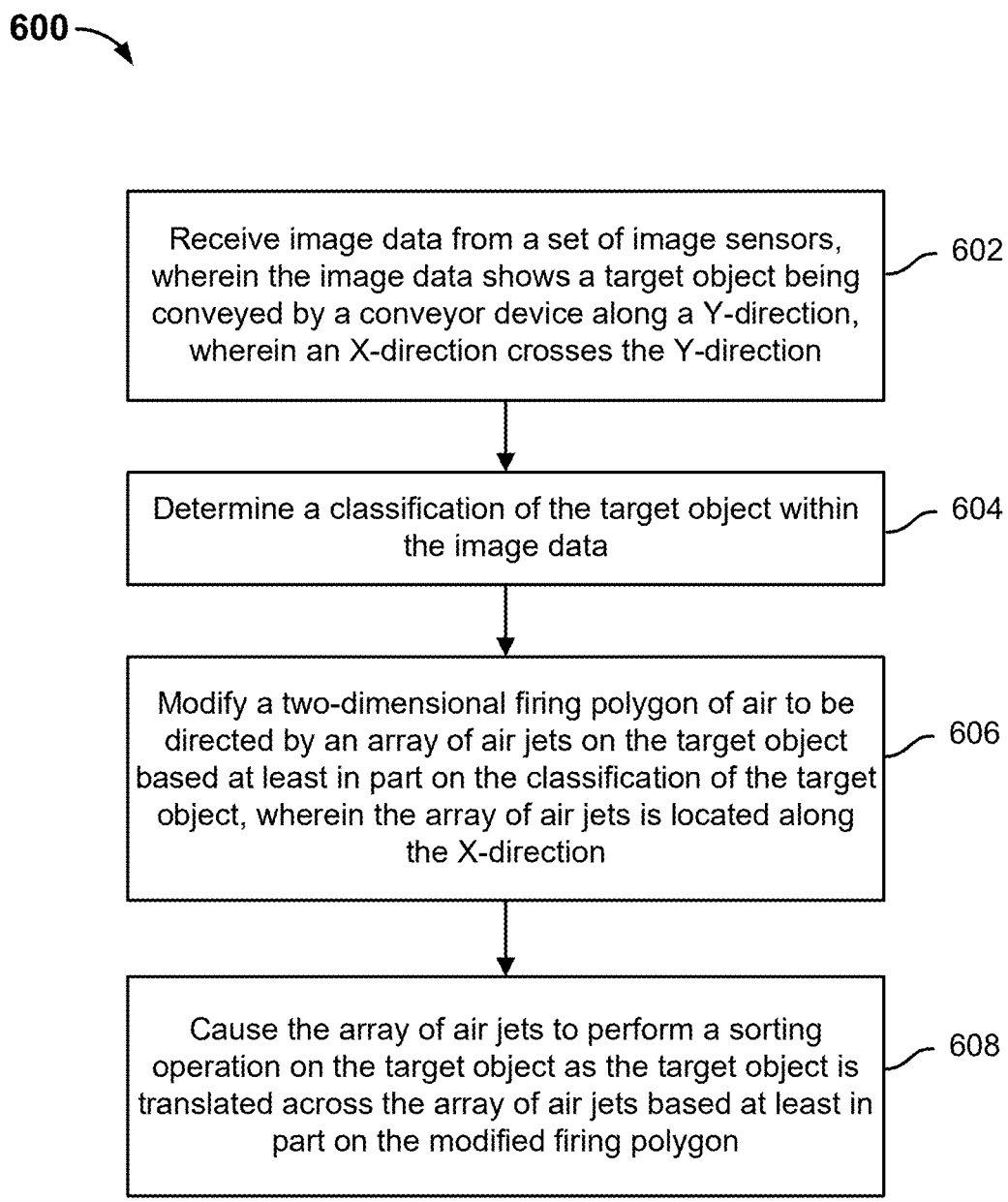
FIG. 6 is a flow diagram showing an embodiment of a process for sorting objects using time-varying control of a controllable air stream.

FIG. 6 is a flow diagram showing an embodiment of a process for sorting objects using time-varying control of a controllable air stream. In some embodiments, process 600 may be implemented, at least in part, by sorting system 100 of FIG. 1. Specifically, in some embodiments, process 600 may be implemented, at least in part, by MCS 102 of sorting system 100 of FIG. 1.

At 602, image data is received from a set of image sensors, wherein the image data shows a target object being conveyed by a conveyor device along a Y-direction, wherein an X-direction crosses the Y-direction. In some embodiments, the image data comprises an image of object(s) on the conveyor belt of a conveyor device that is captured by a single overhead vision/image sensor that is placed above the conveyor device. In some embodiments, the image data comprises two or more images (e.g., captured close in time) of object(s) on the conveyor belt of a conveyor device that is captured by respective two or more overhead vision sensors that are placed above the conveyor device. For example, where there is more than one overhead vision sensor, each sensor's field of view covers only a portion of the width of the conveyor belt but that the field of views of the sensors collectively cover at least the entire width of the conveyor belt. The image data of object(s) is captured prior to the object(s) reaching the end of the conveyor device towards which the objects are being conveyed. The conveyor device is conveying the objects along the Y-direction and the width of the conveyor belt can be measured along the X-direction, which crosses (e.g., perpendicularly intersects) the Y-direction.

At 604, a classification of the target object within the image data is determined. In some embodiments, the image data is analyzed using machine learning techniques to detect the outline/mask of the object(s) shown therein. The attributes (e.g., a material type, a shape, a size, dimensions, a mass, a density, a priority, a condition, a form factor, a color, a polymer, and/or a brand) of each detected object are determined using machine learning techniques. The attributes are compared to target object criteria to determine at least a target object that matches the target object criteria and a non-target object, if any, that does not match the target object criteria. In addition to the set of attributes determined for a target object, the classification of the target object further comprises a proximity degree between that target object and a non-target object that meets the criteria of being a "neighbor" on the conveyor belt. As mentioned above, the proximity degree between that target object and the neighbor non-target object may be a distance between the target object and the neighbor non-target object or an amount of overlap between the target object and the neighbor non-target object.

At 606, a 2D firing polygon of air to be directed by an array of air jets on the target object is modified based at least in part on the classification of the target object, wherein the array of air jets is located along the X-direction. In some embodiments, the classification of the target object is compared to those related to a set of (e.g., previously generated) airflow profiles to select a matching airflow profile. The selected airflow profile defines a firing polygon which includes a sequence of specified air jets in an array of air jets to activate to emit airflow (e.g., at either a fixed or variable pressure) at each point in time during the time period over which a corresponding object is expected to pass across the array of air jets. The array of air jets is located along the X-direction. In some embodiments, a two-dimensional (2D) firing polygon of air to be directed by an array of air jets on the target object as the target object is translated across the array of air jets is determined from the selected airflow profile. In some embodiments, the airflow profile including the 2D firing polygon corresponding to the target object is determined by the MCS. In some embodiments, the airflow profile including the 2D firing polygon corresponding to the target object is determined by a processor that is not part of the MCS.

The firing polygon of the selected airflow profile is then modified to accommodate the detected attributes of the target object and/or the proximity degree between the target object and the neighbor non-target object to ensure that the resulting modified polygon will cause airflow to contact the surface(s) of the target object but minimize the probability that the airflow will also deflect the neighbor non-target object towards a destination intended for target objects.

At 608, the array of air jets is caused to perform a sorting operation on the target object as the target object is translated across the array of air jets based at least in part on the modified firing polygon. The modified firing polygon, the selected airflow profile, and also a start time at which the target object is expected to start passing across the controllable air stream target region of the array of air jets are sent to the air jet array sorting device to execute a sorting operation on the target object, accordingly.

Figure 7:
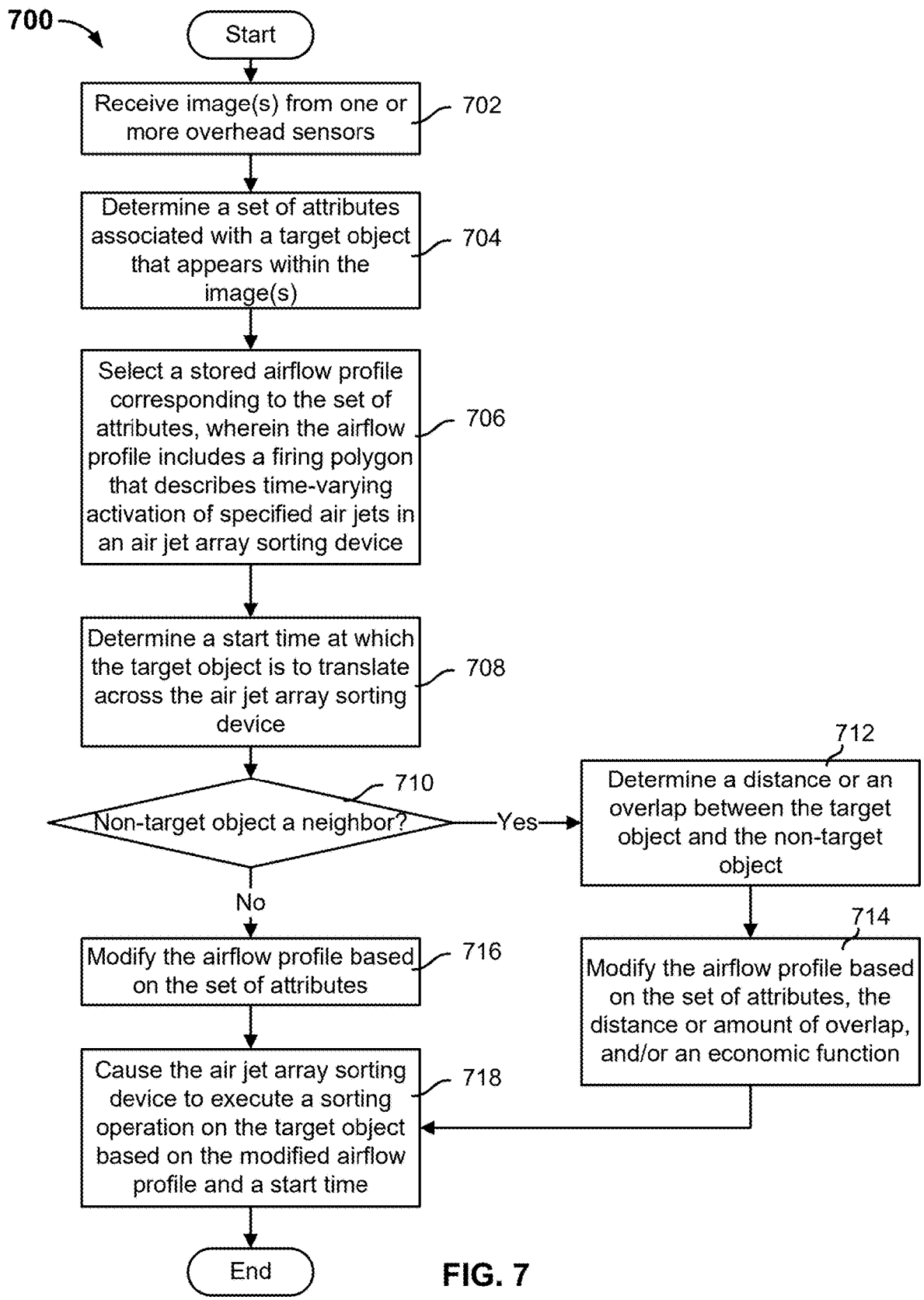
FIG. 7 is a flow diagram showing an example of a process for sorting objects using time-varying control of a controllable air stream in accordance with some embodiments.

FIG. 7 is a flow diagram showing an example of a process for sorting objects using time-varying control of a controllable air stream in accordance with some embodiments. In some embodiments, process 700 may be implemented, at least in part, by sorting system 100 of FIG. 1. Specifically, in some embodiments, process 700 may be implemented, at least in part, by MCS 102 of sorting system 100 of FIG. 1. In some embodiments, process 600 of FIG. 6 may be implemented, at least in part, using process 700.

At 702, image(s) are received from one or more overhead sensors. One or more images (e.g., that were captured close in time) of object(s) on a conveyor device are received.

At 704, a set of attributes associated with a target object that appears within the image(s) is determined. Objects are detected among the image(s) and at least one target object is determined. Attributes associated with the target object are determined. Examples of such attributes include one or more of the following: a material type, a location, a shape, a size, dimensions, a mass, a density, a priority, a condition, a form factor, a color, a polymer, and/or a brand. In some embodiments, a confidence score is assigned to the set of attributes determined for the target object. The confidence score can represent the machine learning model's confidence that the attributes are correct.

At 706, a stored airflow profile corresponding to the set of attributes is selected, wherein the airflow profile includes a firing polygon that describes time-varying activation of specified air jets in an air jet array sorting device. Previously generated airflow profiles are each associated with a corresponding combination of attributes. The combination of attributes associated with an airflow profile describes target objects for which the firing polygon described in the airflow profile has historically yielded desirable sorting results (e.g., historical sorting operations with a higher sorting success rate). In a first example, the firing polygon associated with a piece of cardboard may describe a 2D shape of air to be emitted by an array of air jets that is approximately a 2D rectangular shape with similar air pressure across the activated air jets for the time duration over which the activated air jets are to fire so as to create a laminar airflow that carries the lightweight cardboard towards its desired destination. In a second example, the firing polygon associated with a dense piece of wood may describe a 2D shape of air to be emitted by an array of air jets that is approximately a 2D rectangular shape with different air pressure across the activated air jets at different points in time and in particular, more air pressures to be emitted by specified air jets near the end of the firing duration so as to lift the back end of the piece of wood as that end passes over the air jets.

At 708, a start time at which the target object is to translate across the air jet array sorting device is determined. The start time can be determined based on the known speed of the conveyor device, the detected/current location of the target object, and/or the previously calibrated distance between the end of the conveyor device and the controllable air stream target region of the air jet array sorting device.

At 710, whether a non-target object is a neighbor to the target object is determined. In the event that there is a non-target object that is a neighbor to the target object, control is transferred to 712. Otherwise, in the event that there is not a non-target object that is a neighbor to the target object, control is transferred to 716. Whether a non-target object is detected in the image(s) is determined. Then, it is determined whether a distance between the target object and the non-target object meets a neighbor criterion (e.g., the distance is less than a predetermined distance). For example, objects on the conveyor device may be close together, including desirable target objects and undesirable non-target objects. A target object may even be at least partially overlapping with a non-target object.

At 712, a distance or an overlap between the target object and the non-target object is determined. If the target object and the non-target object overlap, then the approximate area of the target object that is overlapped by the non-target object is determined as a proximity degree between the objects. But if the target object and the non-target object do not overlap, then the shortest distance between the target object that is overlapped by the non-target object is determined as a proximity degree between the objects.

At 714, the airflow profile is modified based on the set of attributes, the distance or amount of overlap, and/or an economic function. The 2D shape of air stream over time defined by the firing polygon may be modified dynamically based upon the proximity of non-objects neighboring the target object. For example, if an undesirable neighbor object is located 4 cm to the left of the target object, and air jets are spaced in 1 cm increments, several of the leftmost jets may be instructed not to fire (or may not be given firing signals) even though the optimal airflow profile would normally dictate utilizing those jets. Also, additional neighboring jets may be instructed to fire in a suppressing profile manner, to assist in pushing the undesirable non-target object away from the target object's intended trajectory. Asymmetric firing instructions may therefore be utilized dynamically to optimize success in targeting desirable objects and suppressing the capture/sorting of undesirable ones. Using the "firing polygon" approach to the jet control signals, the polygon may be reduced asymmetrically into a "suppressed polygon," which is the final, modified polygon the air jets will fire, and accounts for the presence of nearby items and/or their own firing polygons. For example, the modified firing polygon corresponding to a target object that is in the proximity of non-target objects comprises the original airflow profile/time varying control sequence of that object after it has been modified to reduce or increase the number of air jets to fire and/or to reduce or increase the force of air to be emitted by the firing air jets at one or more of the original points in time of the control sequence. Put another way, the detection of non-target objects in proximity to a target object could dynamically modify the execution of the airflow profile/time-varying control sequence determined for that target object. In some embodiments, airflow profiles and asymmetric firing instructions may be coupled to an objective function whereby the economic outcome of the sorting process is maximized. In this scenario, the MCS or another neural processing unit may dynamically calculate the economic success in an equation similar to: Economic output=(value of target object*probability of success of capturing the target object−value of contamination by a neighbor non-target object*probability of capturing the neighbor non-target object). The air jet array sorting device's embedded controller may then in turn be issued control signals based upon the modified airflow profile that is used to optimize this equation. All such calculations and airflow profile generation may be performed by any processor in the overall system, such that the system runs entirely locally at the air jet embedded control processor, in any processor within the facility, within the MCS locally, or in a remote location, based upon the necessary instruction latency requirements.

In some embodiments, the confidence score assigned to the attributes of the target object can also be used to modify the firing polygon to be executed on the target object. For example, the firing polygon can be modified more aggressively (e.g., scaled up or scaled down by more air jet activations) in light of a higher confidence score or the firing polygon can be modified less aggressively (e.g., scaled up or scaled down by fewer air jet activations) in light of a lower confidence score.

In some embodiments, the firing polygon may be modified based on an estimated probability of success for capturing the target object and/or the probability of success for capturing the neighbor non-target object. For example, the probability of success for capturing the target object and/or the probability of success for capturing the neighbor non-target object can be estimated by analyzing the image(s) of the objects via machine learning. A function can be used to evaluate whether the firing polygon to be executed on the target object can be modified to increase or not significantly lower the probability of success for capturing the target object while lowering the probability of success for capturing the neighbor non-target object to an acceptable (e.g., threshold) probability. If the firing polygon to be executed on the target object can not be modified to increase or not significantly lower the probability of success for capturing the target object while lowering the probability of success for capturing the neighbor non-target object to an acceptable probability, then in some embodiments, a sorting operation is determined to not be performed on the target object at all not. But if the firing polygon to be executed on the target object can be modified to increase or not significantly lower the probability of success for capturing the target object while lowering the probability of success for capturing the neighbor non-target object to an acceptable probability, then the firing polygon is modified and then a sorting operation is determined to be executed on the target object based on the modified firing polygon.

In addition to suppressing the firing of air jets at point(s) in time and/or triggering firing of additional air jets at point(s) in time in light of neighbor non-target objects as described above, modifying the firing polygon can also be performed based on the target object's set of attributes. In a first example, the firing polygon can be shifted (e.g., along the X-direction) to match the detected location (e.g., along the X-direction) of the target object. In a second example, the firing polygon can be scaled up (e.g., the number of air jets to activate at each time is increased) or scaled down (e.g., the number of air jets to activate at each time is decreased) to match the detected dimensions, shape, and/or size of the target object.

At 716, the airflow is modified based on the set of attributes. The firing polygon of an airflow profile selected for a target object that does not have a neighbor non-target object can be similarly modified as described above.

At 718, the air jet array sorting device is caused to execute a sorting operation on the target object based on the modified airflow profile and a start time. The selected airflow profile, the modifications to the firing polygon, and the predicted start time are sent as control signals to the air jet array sorting device for the air jet array sorting device to execute a sorting operation on the target object using such control signals. As described above, whether the sorting operation performed based on the airflow profile is successful or not can be audited using sensor feedback (e.g., such as the feedback described in FIG. 3). Such feedback can then be used to update (e.g., the firing polygon described in) that airflow profile and/or used as a basis for generating new airflow profiles.

Figure 8A:
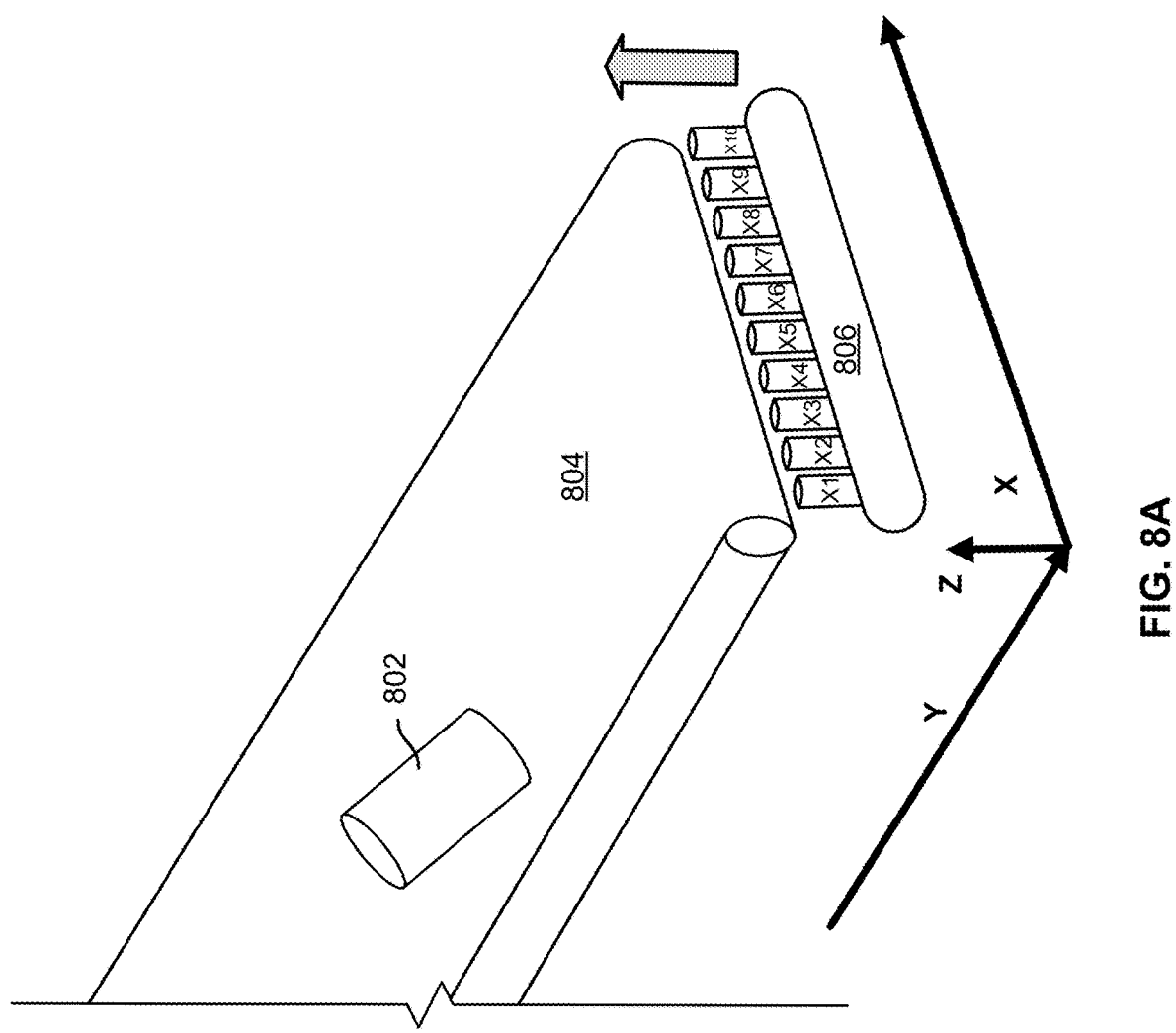
FIG. 8A is a diagram that shows a sorting system in which object 802 is being conveyed by conveyor device 804 towards air jet array sorting device 806.
Figure 8B:
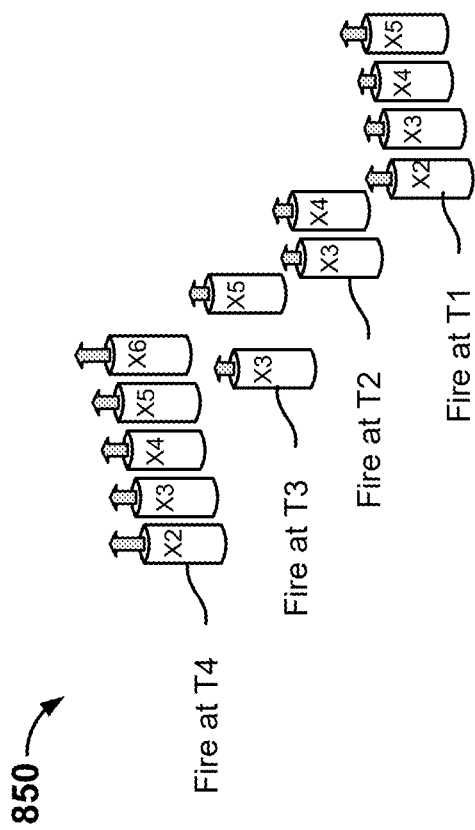
FIG. 8B is a diagram showing the modified firing polygon corresponding to object 802 of FIG. 8A.

FIGS. 8A and 8B describe an example of determining a modified firing polygon to be used by an air jet array sorting device to perform a sorting operation on a target object that does not have a neighbor non-target object. FIG. 8A is a diagram that shows a sorting system in which object 802 is being conveyed by conveyor device 804 towards air jet array sorting device 806, which includes 10 air jets respectively identified by X1, X2, X3, X4, X5, X6, X7, X8, X9, and X10. The air jets of air jet array sorting device 806 are configured to emit airflow upwards in the Z-direction. An image of object 802 had been captured and analyzed to determine that the attributes of object 802 match target object criteria that is used by air jet array sorting device 806 and that therefore, object 802 is a target object relative to air jet array sorting device 806. An airflow profile whose associated object attributes match those of object 802 is selected from storage. The selected airflow profile describes a firing polygon. The firing polygon is then modified based on the attributes of 802. In particular, in this example, the firing polygon is modified to shift the to-be-activated air jets along the X-direction to correspond to the determined X coordinate of (e.g., the centroid of) object 802 and to scale up the number of air jets to fire at each point in time to match the detected dimensions of object 802. FIG. 8B is a diagram showing the modified firing polygon corresponding to object 802 of FIG. 8A. Modified firing polygon 850 prescribes a specified subset of air jets to be fired at each of four points in time starting at time T1, which is equivalent to or is close to the start time at which object 802 is predicted to begin to pass over the controllable air stream target region of air jet array sorting device 806. At time T1, Air Jets X2, X3, X4, and X5 are activated to shoot air upwards along the Z-direction. The amount of pressure of the air that is emitted by each activated air jet is represented by the height of the gray arrow that is pointed out of each air jet. For example, a taller gray arrow indicates a higher pressure than a shorter gray arrow. At time T2, Air Jets X3 and X4 are activated to shoot air upwards along the Z-direction. At time T3, Air Jets X3 and X5 are activated to shoot air upwards along the Z-direction. At time T4, Air Jets X2, X3, X4, X5, and X6 are activated to shoot air upwards along the Z-direction. As shown by modified firing polygon 850, at each point in time, a firing polygon can specify either contiguous or non-contiguous air jets to be activated and different air jets that are activated at the same or different points in time can be activated to shoot out air with different amounts of pressure. While not shown in FIG. 8B, a firing polygon can also specify the dwell time (the firing time duration) for each air jet that is to be activated at a given point in time. In the example of FIG. 8B, the 2D shape of air that is formed over time by activating an array of air jets in accordance to modified firing polygon 850 roughly corresponds to the 2D projection of object 802 to the plane defined by the X and Y directions but there are the greatest number/width of activated air jets at time T4 to ensure that the second end of object 802 that passes over the air jets is engaged with more force to lift object 802 towards the desired destination.

Figure 9A:
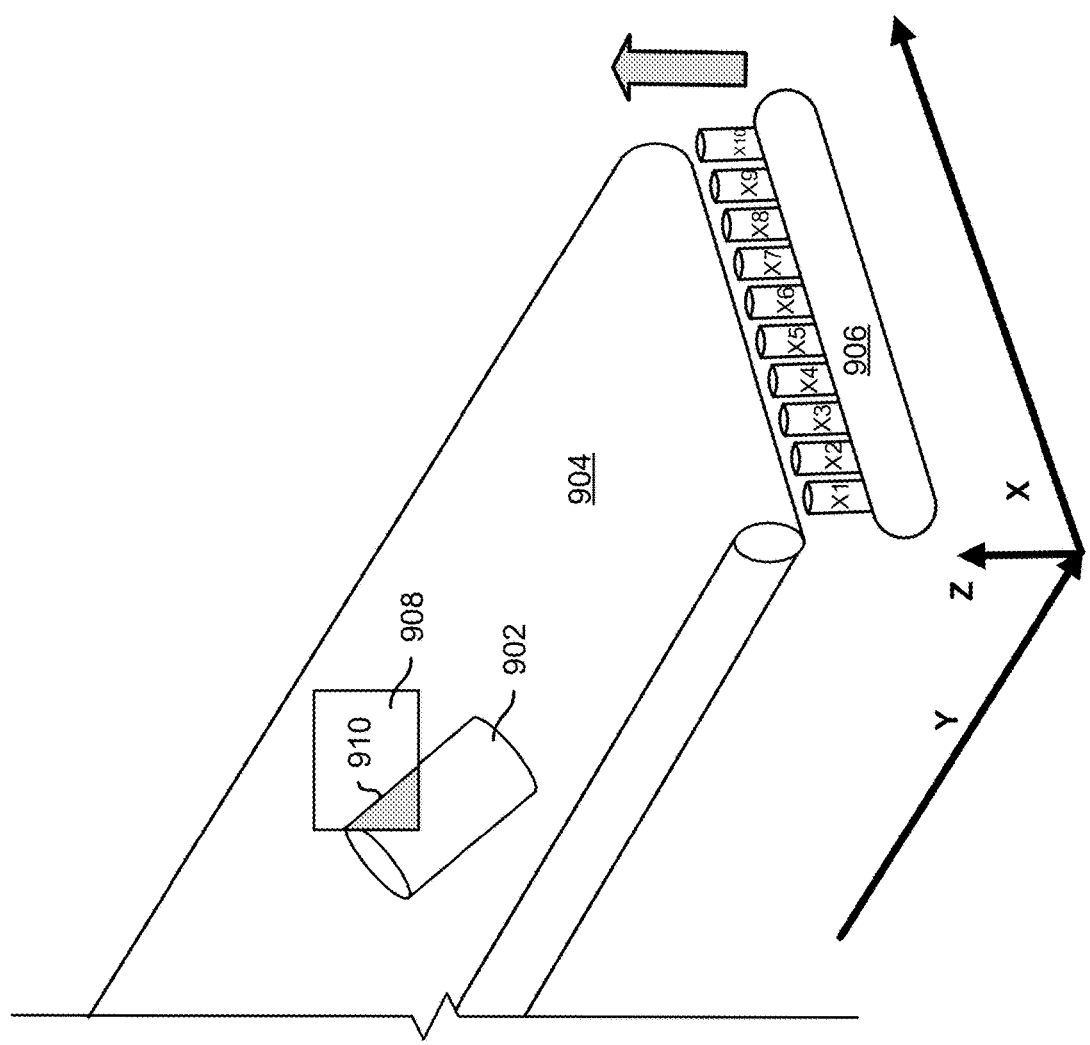
FIG. 9A shows a sorting system that is similar to the sorting system that was shown in FIG. 8B only that target object 902, which is similar to object 802 of FIG. 8A, has an overlapping neighbor non-target object 908.
Figure 9B:
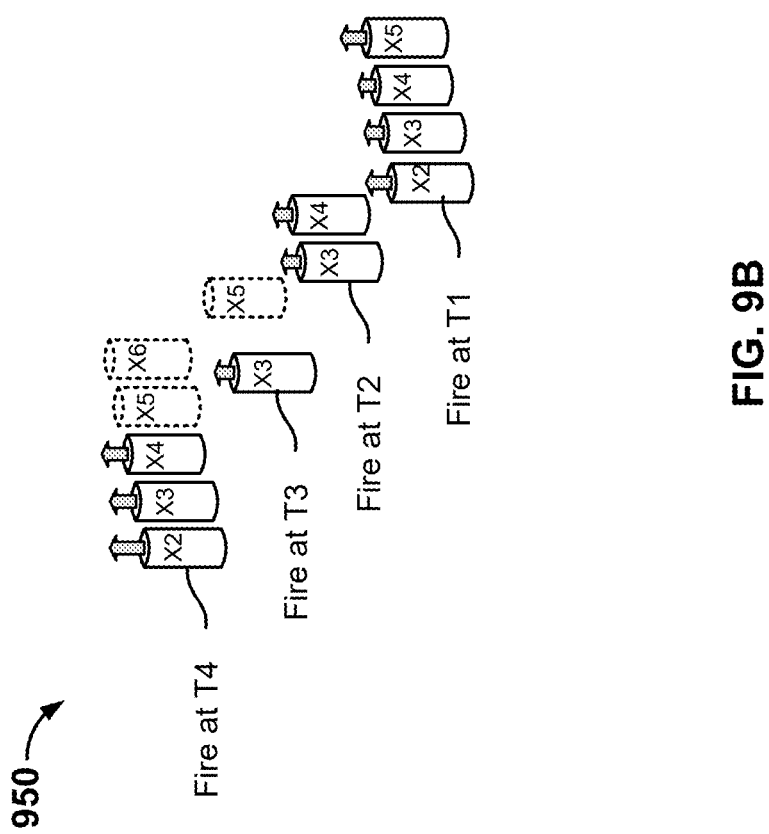
FIG. 9B is a diagram showing the modified firing polygon corresponding to target object 902 of FIG. 9A.

FIGS. 9A and 9B describe an example of determining a modified firing polygon to be used by an air jet array sorting device to perform a sorting operation on a target object that has a neighbor non-target object. FIG. 9A shows a sorting system that is similar to the sorting system that was shown in FIG. 8B only that target object 902, which is similar to object 802 of FIG. 8A, has an overlapping neighbor non-target object 908. Overlap 910 represents the portion of the surface area of target object 902 that is covered by non-target object 908. For example, overlap 910 is characterized based on an overhead image that includes both target object 902 and non-target object 908. As such, the firing polygon of the airflow profile that was selected to correspond to target object 902 needs to be modified based on the attributes of target object 902 and overlap 910. In particular, in this example, the firing polygon is modified to shift the to-be-activated air jets along the X-direction to correspond to the determined X coordinate of (e.g., the centroid of) target object 902, scale up the number of air jets to fire at each point in time to match the detected dimensions of target object 902, and to suppress the firing of a portion of the air jets at one or more points in time to avoid deflecting non-target object 908. FIG. 9B is a diagram showing the modified firing polygon corresponding to target object 902 of FIG. 9A. Modified firing polygon 950 is similar to modified firing polygon 850 of FIG. 8B only that given overlap 910 between target object 902 and non-target object 908, some air jets that were originally designated by the original firing polygon to be fired at certain points in time will no longer be fired. For example, the activation of air jets of the firing polygon that contributes an air stream in the 2D shape of air over time that approximately maps to overlap 910 is suppressed. Specifically, the activations of Air Jet X5 at time T3 and the activations of Air Jets X5 and X6 at time T4 are suppressed while the activations of air jets at times T1 and T2 are not changed in FIG. 9B relative to those of modified firing polygon 850 of FIG. 8B. In the example of FIG. 9B, the 2D shape of air that is formed over time by activating an array of air jets in accordance to modified firing polygon 950 roughly corresponds to the 2D projection of target object 902 to the plane defined by the X and Y directions but excluding the approximate area defined by overlap 910, which therefore limits the chance that airflow will be shot onto non-target object 908 to inadvertently deflect it towards a destination that is intended for only target objects.

Figure 10:
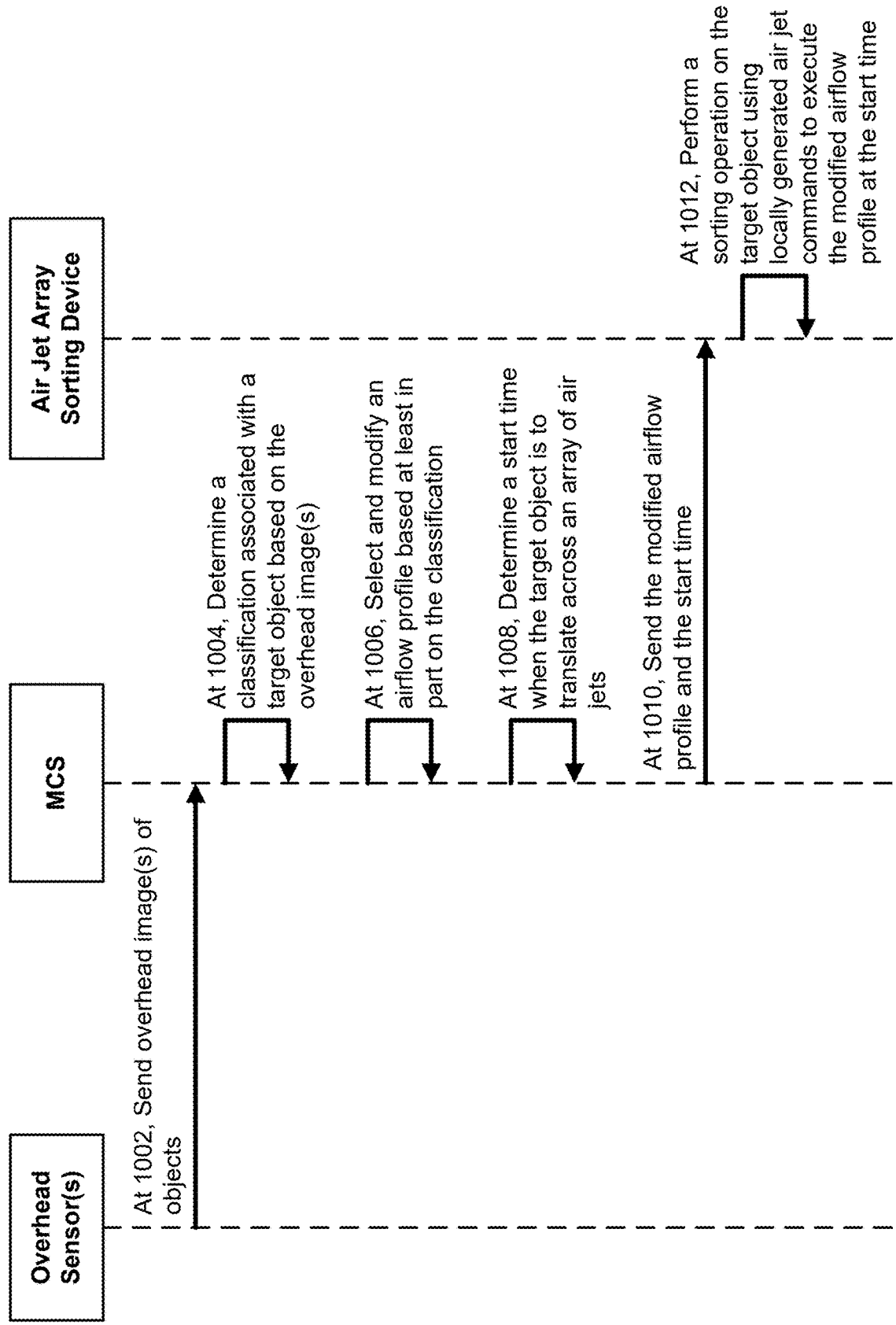
FIG. 10 is a diagram showing an example sequence diagram involving overhead sensors installed above a conveyor device, the MCS, and an air jet array sorting device in accordance with some embodiments.

FIG. 10 is a diagram showing an example sequence diagram involving overhead sensors installed above a conveyor device, the MCS, and an air jet array sorting device in accordance with some embodiments. At 1002, overhead images are sent from one or more overhead sensors to the MCS. At 1004, a classification associated with a target object is determined by the MCS based on the overhead image(s). At 1006, an airflow profile is selected and modified by the MCS based at least in part on the classification. At 1008, a start time when the target object is to translate across an array of air jets is determined by the MCS. At 1010, the modified airflow profile and the start time are sent from the MCS to the air jet array sorting device. At 1012, a sorting operation is performed by the air jet array sorting device using locally generated air jet commands to execute the modified airflow profile at the start time. For example, the air jet commands could have been received from the MCS or translated by the air jet array sorting device using the control signals from the MCS and locally stored internal data structures.

Figure 11:
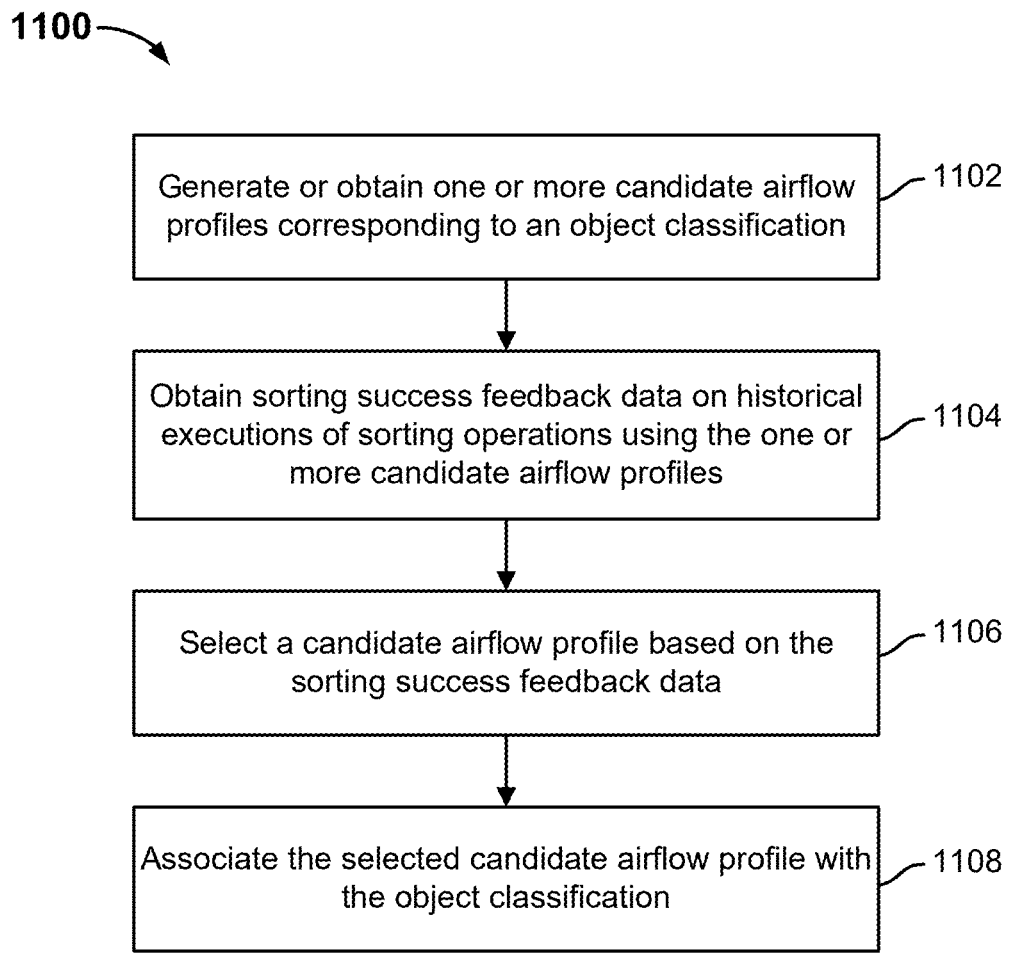
FIG. 11 is a flow diagram showing an example of a process for generating or updating airflow profiles in accordance with some embodiments.

FIG. 11 is a flow diagram showing an example of a process for generating or updating airflow profiles in accordance with some embodiments. In some embodiments, process 1100 may be implemented, at least in part, by sorting system 100 of FIG. 1. Specifically, in some embodiments, process 1100 may be implemented, at least in part, by MCS 102 of sorting system 100 of FIG. 1.

For example, process 1100 can be triggered with respect to a particular object classification if the historical sorting success rate associated with executing an existing airflow profile for that object classification is less than a desirable rate.

At 1102, one or more candidate airflow profiles corresponding to an object classification are generated or obtained. In some embodiments, candidate airflow profiles (including different respective firing polygons) corresponding to an object classification (e.g., a combination of object attributes) can be programmatically or manually generated. In some embodiments, a candidate airflow profile is generated for an object based at least in part on one or more aerodynamic attributes of the object type, such as moisture, density, shape, and known flight-pattern characteristics, for example. In some embodiments, these aerodynamic profiles are modulated based on high-speed camera trajectory analysis. Once a candidate airflow profile is created, a corresponding set of control signals may also be created, specific to a type of jet array (e.g., control signals for a two-dimensional jet array are different than for a single array of jets). Note that the control signals typically incorporate conveyance system speed into their calculations, enabling a single row of jets to effectively control a 2D airspace by using the relative motion of conveyed objects across their surface. The candidate airflow profile may be translated into a set of control systems that effectively generate a "firing polygon," whereby specific jets are triggered based on the polygon. In some embodiments, the polygon shape of a target object is determined based at least in part on the 2D projection of the target object onto the surface of the conveyor device.

At 1104, sorting success feedback data on historical executions of sorting operations is obtained using the one or more candidate airflow profiles. Each of the candidate airflow profiles is utilized by air jet array sorting devices to perform sorting operations (e.g., in response to the instruction of the MCS) and the success or failure of each such sorting operation associated with each candidate airflow profile is monitored (e.g., over an observational period in the training phase). For example, whether a sorting operation on a target object is successful or not can be determined using the feedback image data that is provided by one or more vision sensors that are placed downstream of the location at which the sorting operation was performed and/or a vision sensor that captures an image of the sorting operation as it is being performed (e.g., such as described in FIG. 3).

At 1106, a candidate airflow profile is selected based on the sorting successes feedback data. The candidate airflow profile that is associated with the highest sorting success rate (e.g., the candidate airflow profile that yielded the greatest percentage of successful sorting operations performed on target objects associated with the particular object classification) is selected.

At 1108, the selected candidate airflow profile is associated with the object classification. The selected candidate airflow profile is then associated with the object classification and may be selected by the MCS to use in the execution of a subsequent sorting operation on a target object with that object classification.

As an alternative to process 1100, in some embodiments, a candidate airflow profile with an initial firing polygon associated with an object classification can be iteratively and programmatically adjusted based on feedback data and an objective function until a stop criterion is met. For example, each iteration of the candidate airflow profile is utilized by air jet array sorting devices to perform sorting operations (e.g., in response to the instruction of the MCS) and the success or failure of each such sorting operation is monitored (e.g., over a corresponding observational period in the training phase). If after the current observational period, the stop criterion of the objective function is not met, then the sorting success feedback data (e.g., the sorting success rate and/or an analysis of the types of sorting failures such as the trajectories of the failed sorts) is used to programmatically adjust the firing polygon of the candidate airflow profile using the objective function to create a next iteration of the candidate airflow profile. Sorting success feedback data is again monitored for the next iteration of the candidate airflow profile until the stop criterion (e.g., the sorting success feedback meets a desired condition such as a threshold sorting success rate) is met. Then, the iteration of the candidate airflow profile that meets the stop criterion will be associated with the object classification and may be selected by the MCS to use in the execution of a subsequent sorting operation on a target object with that object classification.

Figure 12:
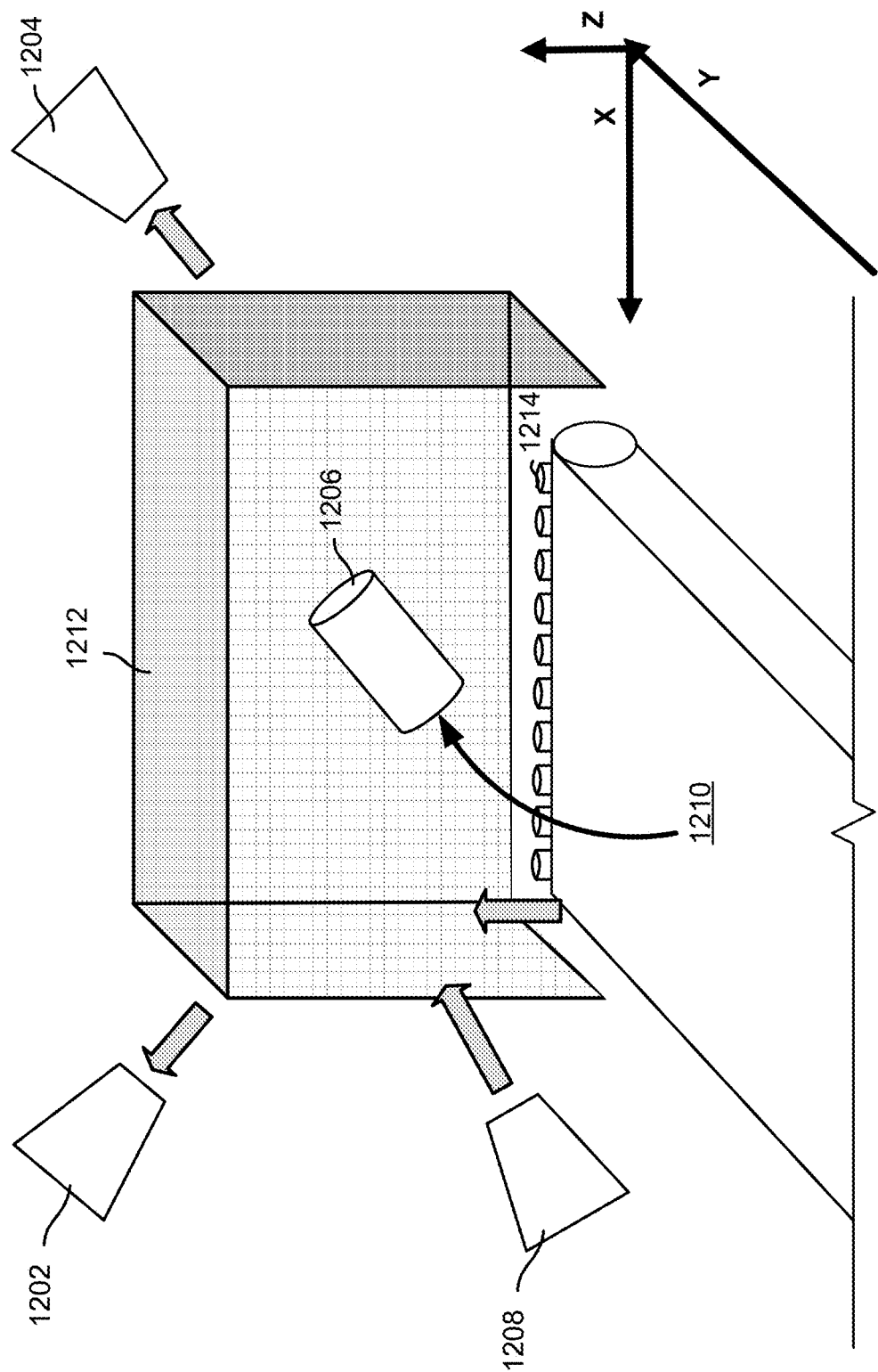
FIG. 12 is a diagram showing a capture cage that is configured to catch objects that are fired upon by an air jet array sorting device in accordance with some embodiments.

FIG. 12 is a diagram showing a capture cage that is configured to catch objects that are fired upon by an air jet array sorting device in accordance with some embodiments. In some embodiments, air jets of air jet array sorting device 1214 direct target objects (e.g., object 1206) that fall off conveyor device 1210 into a capture cage 1212 that aerodynamically contains the objects on their flight path to a bunker (not shown) or secondary conveyance device (not shown). As shown in the example of FIG. 12, capture cage 1212 can be a simple hood structure to manage the airflow and further direct objects. In some embodiments, the hood has a construction using a perforated or mesh structure that does not impede airflow to prevent blowback or vortices from occurring as air jets push air towards the structure. A problem with the capture cage approach is that undesirable fines, wet material, etc. may attach to the mesh structure, eventually clogging or partially blocking airflow. In some embodiments, a suction (negative pressure) airflow that is provided by suction devices, such as suction devices 1202 and 1204, on the opposite side of the mesh of capture cage 1212, cause fines and undesirable material to be removed from capture cage 1212 before they have a chance to build up. Suction devices 1202 and 1204 may operate periodically, on demand, or in some cases continuously, depending on the system need. Vacuum pressure provided by suction devices 1202 and 1204 may be monitored by the MCS and periodically switched to positive pressure or increased in negative pressure to prevent buildup, similar to anti-clogging techniques used elsewhere. FIG. 12 also shows auxiliary blower device 1208 that shoots a laminar airflow in the direction of capture cage 1212 and/or the intended direction of a target object (e.g., object 1206) that is fired upon by air jet array 1214. Put another way, auxiliary blower device 1208 provides a secondary airflow to the action of the firing air jets of air jet array sorting device 1214, providing a laminar flow field to further propel (e.g., larger) objects in the desired direction. In some embodiments, assisting jets (e.g., auxiliary blower device 1208) may create additional time-based airflow profiles to help objects along the trajectory targeted by the firing jet air profile (e.g., a targeted "air knife" approach). Alternatively, the assisting jets (e.g., auxiliary blower device 1208) may simply create a constant airflow profile targeting a specific deposit area, where this new airflow profile begins a short distance from the jets firing in air jet array sorting device 1214. In either scenario, the air jets of air jet array sorting device 1214 provide the impetus to launch the target object from conveyor device 1210 and in a desired direction. The secondary airflow then assists and provides additional air pressure in that desired direction once the target object reaches the edge of the new airflow's laminar flow envelope.

While not shown in FIG. 12, in some embodiments, one or more auxiliary blowers or jets could also be included in capture cage 1212 to augment laminar flow.

Also, while not shown in FIG. 12, in some embodiments, one or more auxiliary blowers or jets could also be pointed at one or more air jets of air jet array sorting device 1214 to (e.g., periodically or in response to a detected clog) direct positive airflow on the air jet(s) to prevent or remove clogs.

Figure 13:
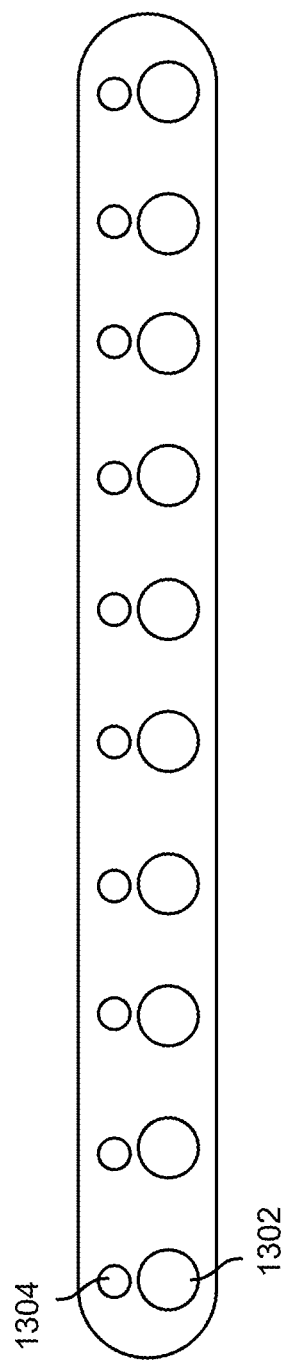
FIG. 13 is a diagram showing a bird's eye view of an example air jet array sorting device that includes a corresponding light-emitting diode (LED) light to each air jet in accordance with some embodiments.

FIG. 13 is a diagram showing a bird's eye view of an example air jet array sorting device that includes a corresponding light-emitting diode (LED) light to each air jet in accordance with some embodiments. The collection of the LED lights that correspond to the array of air jets forms a "LED light bar" that is coupled to the jet array to measure actual performance of the system during a calibration phase. For example, LED light 1304 corresponds to Air Jet 1302 and during calibration, lights up when Air Jet 1302 is activated. An example of this was described with FIG. 3, where Air Jet Array Sorting Device 304 may be augmented with an LED aligned horizontally with each air jet. In other embodiments, a fewer or greater number of LEDs may be utilized, but the alignment of the LED to the jet array is known a priori (e.g., fixed or moveable in a deterministic manner).

Figure 14:
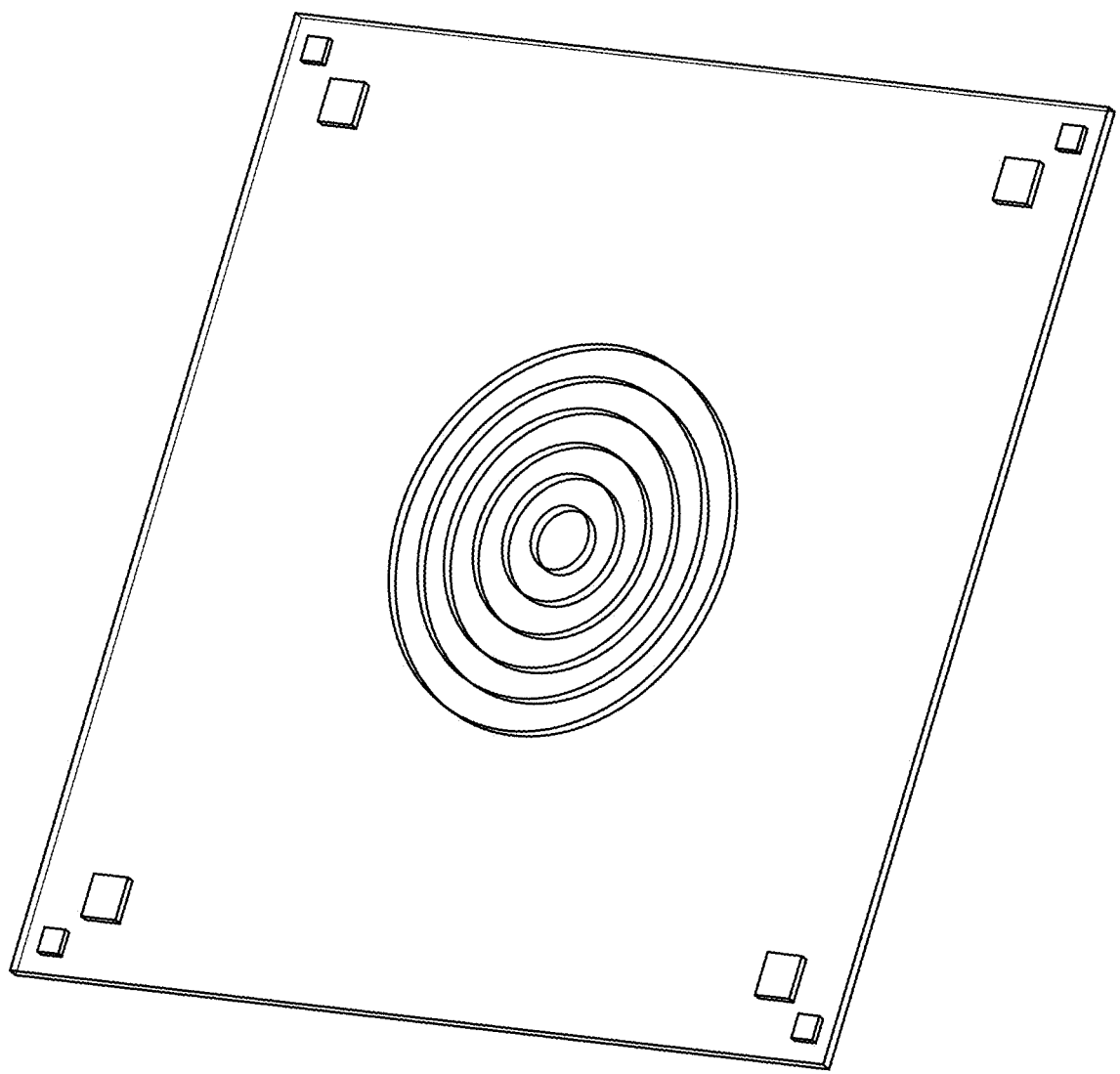
FIG. 14 is a diagram showing an example known object.

In some embodiments, to calibrate the system during the calibration phase, known objects (e.g., objects whose attributes are known in advance) are run through the sorting line, enabling efficient gathering and analysis of performance metrics. Objects may be representative of actual target objects with metrics affixed for subsequent analysis, or may be pure metrics themselves, such as the example known object shown in FIG. 14. A known object might represent a 2D version of a target object (e.g., an aluminum can), and may be translucent to facilitate LED pulse capture by a calibration camera (e.g., such as the Calibration Camera that is included in FIG. 3). An ML vision subsystem is first trained to recognize the calibration objects from images of the calibration objects using standard neural processing algorithms. In some embodiments, the neural network nodes for calibration training may be downloaded from another facility or from a cloud service (e.g., such as the MCS). The operator may use the MCS control user interface or other interface to put the sorting line (or individual sorting devices) into a "calibration mode." Once the system is put into this mode, the sorting line can be run using the target objects. In some embodiments, each target object is identified and tracked using the ML vision subsystem and trajectory tracking algorithms of the MCS, and a "capture profile" is generated for the object. Unlike during runtime in which "airflow profiles" are used, the capture profile is directed towards LED activity as an emulator for jet activity. The capture profile mimics an air jet capture profile (e.g., which "jets" to activate, dwell time, which jets should be suppressed, pressure intensity, etc.). LEDs of some embodiments may be single color LEDs, or multicolor. In the case of multi-color LEDs, the color may be used to indicate varying pressure levels in the profile. As the calibration object traverses the sorting line, the LED control acts upon the capture profile, causing target LEDs (jet substitutes) to illuminate at varying intensity levels. In the case of multi-color LEDs, the illumination may also vary in color based on the pressure profile. For example, the color may change from light blue to darker blue to green to orange and then red as the pressure profile increases.

In some embodiments, calibration objects may include objects that mimic physical characteristics of desired target or non-target objects. Physical characteristics may include such things as volumetric dimensions (shape), mass, and chemical composition, for example. They may also include visually distinctive tracking features (e.g., markings and/or are translucent) that enable the calibration camera to compare actual firing profiles used during calibration with the desired profiles for specific object types. Calibration objects may be deployed automatically in various (X, Y) positions and orientations on the belt based upon a mathematically calculated distribution needed to optimize calibration. For example, individual objects of various types may be distributed to ensure full calibration across the entire jet array, and various overlaps may be used to encourage or discourage neighbor suppression algorithms in the firing profiles, ensuring that calibration is valid even in non-perfect capture scenarios.

Figure 15:
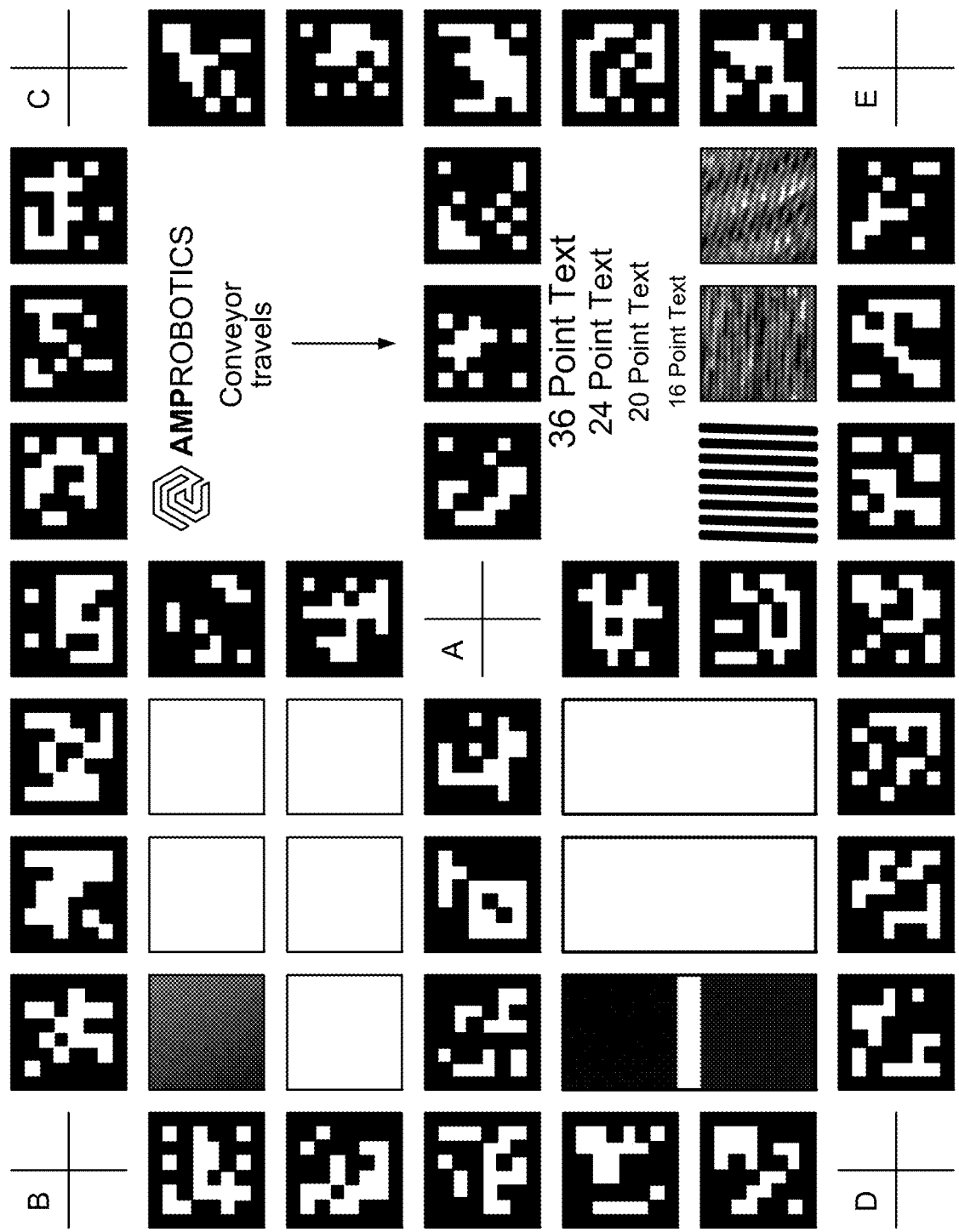
FIG. 15 is a diagram showing an example fiducial placard.

In some embodiments, the calibration camera (e.g., the Audit Sensor of FIG. 3) captures one or more images of the jet array/LED system during the calibration procedure. The calibration camera (and any other vision sensors used in the system) may itself be calibrated for visual accuracy prior to calibration of the overall system, and then at any time where such calibration drifts. An example fiducial placard that may be used to effectuate this is, is shown in FIG. 15. The vision sensor is installed in its location and calibrated for pitch/yaw/latency detection using the fiducial. The fiducial placard is placed in various locations and run through the conveyance system, and images are compared to evaluate distortions in various dimensions. The ML vision subsystem can then use the distortion measurements to adjust the images and/or the object and trajectory recognition software for the camera variances.

To use the LED light bar, calibration object, and calibration camera to perform calibration of an air jet, the following example process can be performed: A simulated object capture is performed in which the LEDs corresponding to activated air jets are caused to light up when those air jets should fire during a sorting operation (e.g., execution of a modified firing polygon associated with a selected airflow profile) on a known calibration object of a given shape/location on a conveyor belt. High speed images can be captured by the calibration camera of the air jets and then reviewed to determine whether the expected LEDs (corresponding to activated air jets) lit up, how, and when. The captured images of the LEDs are compared to the desired execution of the selected airflow profile to determine whether the correct LED/air jets were activated (e.g., with the right pressure) given the shape/location on a conveyor belt. For example, the captured images may point to a mismatch between the location/shape of the object on the conveyor belt and the locations of air jets/LEDs that were actually activated.

In some embodiments, the calibration camera may also be used as a quality control audit ML vision subsystem during normal operation. After capturing images of the simulated target object capture the calibration camera may send the images to the MCS or other processing software for analysis. In some embodiments, the analysis may be performed manually by an operator. In other embodiments, an ML vision subsystem may be trained to analyze the images. In either case, the images are analyzed to determine the X (position across belt), Y (position along belt) spatial offset of the target object with respect to the lit LED sequence. For example, an image may show that the object is 40 mm adjacent to the firing LED in the X direction, and 20 mm past the LED in the Y direction. Based on this information, the control system may be instructed to adjust its capture profile accordingly (e.g., change the timing or position of the LED firing). For example, if the LEDs (and jets) are located 20 mm apart from each other in width, in this case a new capture profile may be generated, specifying that the jet two jets over fires, and does so earlier (based on the 20 mm overshoot). A control software implementation of some embodiments uses a reference frame for its calculations, where such a reference frame represents a mapping from the sorting line world metric to a digital, pixel-based metric. In this case, the calibration information may be used to adjust the reference frame, resulting in a new capture profile.

In some embodiments, multiple runs are performed, at varying belt speeds, and locations across the belt. In this case, the calibration information may be collated into a data structure, creating a multi-dimensional representation of the calibration error as a function of belt width and speed. This is particularly useful to address vision system calibration errors as described above. With a warped lens or tilted camera angle, the positional error may vary distinctly across the belt. Similarly, if the control software utilizes trajectory modeling (e.g., a dynamic Kalman filter estimator) or a digital encoder on the belt to calculate velocity, this enables even nonlinear modeling errors to be accurately addressed. In some embodiments, a dynamic model of the system (e.g., using the dynamics of the electro-mechanical system) is implemented in software to track trajectories of objects over time. The initial conditions for the model may in turn be calibrated with the then-current belt speed as determined by an encoder or parameters captured from the variable frequency drives (VFDs) moving the conveyance belt. The data structure may then be utilized to adjust capture profiles, internal representational models/metrics, or both. Once such adjustment is performed (either automatically by the ML-based control software or manually by an operator), the calibration objects may be run through the system again to further refine performance and validate accuracy.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A sorting system, comprising:
a set of image sensors configured to capture image data showing a target object being conveyed by a conveyor device along a Y-direction;
an array of air jets located along an X-direction, wherein the X-direction crosses the Y-direction; and
a processor configured to:
receive the image data from the set of image sensors;
determine a classification of the target object within the image data; and
modify a two-dimensional firing polygon of air to be directed by the array of air jets on the target object based at least in part on the classification of the target object, wherein to modify the two-dimensional firing polygon based at least in part on the classification of the target object comprises to shift a subset of air jets to activate along the X-direction at one or more points in time to accommodate a location of the target object; and
wherein the array of air jets is configured to perform a sorting operation on the target object as the target object is translated across the array of air jets based at least in part on the modified two-dimensional firing polygon.

2. The sorting system of claim 1, wherein the classification comprises a set of attributes of the target object.

3. The sorting system of claim 2, wherein the set of attributes includes one or more of the following: a material type, a shape, a size, dimensions, a mass, a density, a priority, a condition, a form factor, a color, a polymer, and a brand.

4. The sorting system of claim 1, wherein the classification comprises a proximity degree between the target object and a neighbor non-target object.

5. The sorting system of claim 4, wherein the proximity degree between the target object and the neighbor non-target object comprises a distance between the target object and the neighbor non-target object or an overlap amount between the target object and the neighbor non-target object.

6. The sorting system of claim 1, wherein the two-dimensional firing polygon describes at each of a series of points in time one or more of the following: a specified subset of air jets to activate, specified air pressures at which the specified subset of air jets should be activated, and specified dwell times for which the specified subset of air jets should be activated.

7. The sorting system of claim 6, wherein the specified subset of air jets includes contiguous air jets.

8. The sorting system of claim 6, wherein the specified subset of air jets includes non-contiguous air jets.

9. The sorting system of claim 1, wherein to modify the two-dimensional firing polygon based at least in part on the classification of the target object comprises to increase the subset of air jets to activate at the one or more points in time to scale up a two-dimensional area defined by the two-dimensional firing polygon to accommodate a size of the target object.

10. The sorting system of claim 1, wherein to modify the two-dimensional firing polygon based at least in part on the classification of the target object further comprises to decrease the subset of air jets to activate at the one or more points in time to scale down a two-dimensional area defined by the two-dimensional firing polygon to accommodate a size of the target object.

11. The sorting system of claim 1, wherein to modify the two-dimensional firing polygon based at least in part on the classification of the target object further comprises to decrease the subset of air jets to activate at the one or more points in time to avoid firing air on a neighbor non-target object.

12. The sorting system of claim 1, wherein to modify the two-dimensional firing polygon based at least in part on the classification of the target object further comprises to add additional air jets to activate at the one or more points in time to push away a neighbor non-target object from an intended trajectory of the target object.

13. The sorting system of claim 1, wherein to modify the two-dimensional firing polygon based at least in part on the classification of the target object further comprises to decrease the subset of air jets to activate at the one or more points in time based on an economic function that considers a first value of the target object and a second value of a neighbor non-target object.

14. The sorting system of claim 1, wherein to modify the two-dimensional firing polygon based at least in part on the classification of the target object is based at least in part on a confidence score associated with the classification.

15. The sorting system of claim 1, wherein the processor is further configured to determine a start time at which the target object is to start being translated across the array of air jets based at least in part on a speed of the conveyor device.

16. The sorting system of claim 1, wherein the processor is configured to send to the array of air jets one or more jet commands to execute the modified two-dimensional firing polygon over a network.

17. The sorting system of claim 1, wherein the processor is configured to send control signals related to the modified two-dimensional firing polygon over a network and wherein an embedded controller located at the array of air jets is configured to locally generate one or more jet commands to execute the modified two-dimensional firing polygon.

18. The sorting system of claim 1, wherein the set of image sensors comprises a first image sensor and a second image sensor, and wherein the first image sensor maps to a first subset of air jets within the array of air jets and the second image sensor maps to a second subset of air jets within the array of air jets.

19. The sorting system of claim 1, wherein the processor is further configured to determine whether the sorting operation was successful based at least in part on a first captured image showing the performance of the sorting operation on the target object by the array of air jets or a second captured image showing objects downstream of the array of air jets.

20. The sorting system of claim 19, wherein whether the sorting operation was successful is used to determine whether the two-dimensional firing polygon should be updated.

21. A sorting system, comprising:
a set of image sensors configured to capture image data showing a target object being conveyed by a conveyor device along a Y-direction;
an array of air jets located along an X-direction, wherein the X-direction crosses the Y-direction; and
a processor configured to:
receive the image data from the set of image sensors;
determine a classification of the target object within the image data; and
modify a two-dimensional firing polygon of air to be directed by the array of air jets on the target object based at least in part on the classification of the target object, wherein to modify the two-dimensional firing polygon based at least in part on the classification of the target object further comprises to decrease a subset of air jets to activate at one or more points in time based on an economic function that considers a first value of the target object and a second value of a neighbor non-target object; and
wherein the array of air jets is configured to perform a sorting operation on the target object as the target object is translated across the array of air jets based at least in part on the modified two-dimensional firing polygon.

22. A sorting system, comprising:
a set of image sensors configured to capture image data showing a target object being conveyed by a conveyor device along a Y-direction;
an array of air jets located along an X-direction, wherein the X-direction crosses the Y-direction; and
a processor configured to:
receive the image data from the set of image sensors;
determine a classification of the target object within the image data; and
modify a two-dimensional firing polygon of air to be directed by the array of air jets on the target object based at least in part on the classification of the target object, wherein to modify the two-dimensional firing polygon based at least in part on the classification of the target object is based at least in part on a confidence score associated with the classification; and
wherein the array of air jets is configured to perform a sorting operation on the target object as the target object is translated across the array of air jets based at least in part on the modified two-dimensional firing polygon.

23. A sorting system, comprising:

a set of image sensors configured to capture image data showing a target object being conveyed by a conveyor device along a Y-direction;

an array of air jets located along an X-direction, wherein the X-direction crosses the Y-direction; and a processor configured to:
- receive the image data from the set of image sensors, wherein the set of image sensors comprises a first image sensor and a second image sensor, and wherein the first image sensor maps to a first subset of air jets within the array of air jets and the second image sensor maps to a second subset of air jets within the array of air jets;
- determine a classification of the target object within the image data; and
- modify a two-dimensional firing polygon of air to be directed by the array of air jets on the target object based at least in part on the classification of the target object; and wherein the array of air jets is configured to perform a sorting operation on the target object as the target object is translated across the array of air jets based at least in part on the modified two-dimensional firing polygon.

* * * * *